(12) United States Patent
Piersol et al.

(10) Patent No.: US 8,555,195 B2
(45) Date of Patent: Oct. 8, 2013

(54) BOOKMARK FUNCTION FOR NAVIGATING ELECTRONIC DOCUMENT PAGES

(75) Inventors: Kurt W. Piersol, Campbell, CA (US); Kanae Amemiya, Cupertino, CA (US)

(73) Assignee: Ricoh Co., Ltd., Tokyo (JP)

( * ) Notice: Subject to any disclaimer, the term of this patent is extended or adjusted under 35 U.S.C. 154(b) by 303 days.

(21) Appl. No.: 12/826,306

(22) Filed: Jun. 29, 2010

(65) Prior Publication Data

US 2011/0320976 A1    Dec. 29, 2011

(51) Int. Cl.
*G06F 3/048*    (2013.01)

(52) U.S. Cl.
USPC .......................................................... 715/787

(58) Field of Classification Search
USPC ................... 715/810, 863, 787; 345/684
See application file for complete search history.

(56) References Cited

U.S. PATENT DOCUMENTS

| | | | | |
|---|---|---|---|---|
| 5,095,448 | A * | 3/1992 | Obuchi et al. | 715/201 |
| 5,283,864 | A * | 2/1994 | Knowlton | 715/776 |
| 5,339,391 | A * | 8/1994 | Wroblewski et al. | 345/607 |
| 5,506,951 | A * | 4/1996 | Ishikawa | 715/786 |
| 5,550,969 | A * | 8/1996 | Torres et al. | 715/787 |
| 5,663,748 | A * | 9/1997 | Huffman et al. | 345/173 |
| 5,903,267 | A * | 5/1999 | Fisher | 715/786 |
| 6,331,866 | B1 * | 12/2001 | Eisenberg | 715/784 |
| 6,339,437 | B1 * | 1/2002 | Nielsen | 715/787 |
| 7,493,572 | B2 * | 2/2009 | Card et al. | 715/850 |
| 8,018,518 | B2 | 9/2011 | Nobels | |

| | | | |
|---|---|---|---|
| 2005/0091604 | A1 * | 4/2005 | Davis ........................... 715/772 |
| 2005/0219263 | A1 | 10/2005 | Thompson et al. |
| 2006/0114488 | A1 | 6/2006 | Motamed |
| 2006/0212359 | A1 | 9/2006 | Hudgeon |
| 2006/0218127 | A1 | 9/2006 | Tate et al. |
| 2006/0253478 | A1 | 11/2006 | Graham et al. |
| 2006/0287950 | A1 | 12/2006 | Steinberg et al. |
| 2007/0047781 | A1 | 3/2007 | Hull et al. |
| 2007/0192729 | A1 * | 8/2007 | Downs ......................... 715/786 |
| 2007/0226374 | A1 | 9/2007 | Quarterman et al. |
| 2008/0030599 | A1 | 2/2008 | Stavely et al. |
| 2008/0040162 | A1 | 2/2008 | Brice |
| 2008/0059390 | A1 | 3/2008 | Cox et al. |
| 2008/0129667 | A1 | 6/2008 | Zehner et al. |

(Continued)

FOREIGN PATENT DOCUMENTS

| | | |
|---|---|---|
| CN | 101147130 | 3/2008 |
| JP | 08-335214 | 12/1996 |

(Continued)

OTHER PUBLICATIONS

Laasko et al., "Improved Scroll Bars", CHI 2000 Conference on Human Factors in Computing Systems, pp. 97-98, Jan. 2000.*

(Continued)

*Primary Examiner* — Stephen Hong
*Assistant Examiner* — Joseph R Burwell
(74) *Attorney, Agent, or Firm* — Patent Law Works LLP

(57) ABSTRACT

A graphic user interface combines a position bar for moving between pages in a document and with a page bookmarking or referencing function. The position bar includes a selectable box that can be used to set a reference mark on a particular page of a document. The user interface also interprets input near the position bar to change the page to the page of the reference mark when the input is within a predefined range of the reference mark.

20 Claims, 16 Drawing Sheets

(56) References Cited

U.S. PATENT DOCUMENTS

| | | | |
|---|---|---|---|
| 2008/0184145 | A1* | 7/2008 | Gould .................... 715/764 |
| 2009/0012887 | A1 | 1/2009 | Taub et al. |
| 2009/0086945 | A1 | 4/2009 | Buchanan et al. |
| 2009/0094275 | A1 | 4/2009 | Patton et al. |
| 2010/0179816 | A1 | 7/2010 | Wu et al. |
| 2010/0179882 | A1 | 7/2010 | Rigole |
| 2010/0239176 | A1 | 9/2010 | Yamakado |
| 2011/0060910 | A1 | 3/2011 | Gormish et al. |
| 2011/0137818 | A1 | 6/2011 | Goad et al. |
| 2011/0145094 | A1 | 6/2011 | Dawson et al. |
| 2011/0231745 | A1 | 9/2011 | Levesque et al. |

FOREIGN PATENT DOCUMENTS

| | | |
|---|---|---|
| JP | 09-325879 | 12/1997 |
| JP | 2000-69304 | 3/2000 |
| JP | 2000-287164 | 10/2000 |
| JP | 20045700 | 1/2004 |
| JP | 2006-331122 | 12/2006 |
| JP | 2007-257670 | 10/2007 |
| JP | 2007-328489 | 12/2007 |
| JP | 2008-097435 | 4/2008 |
| JP | 2008-524735 | 7/2008 |
| JP | 2008-204469 | 9/2008 |
| JP | 2008537816 | 9/2008 |
| JP | 2009-003596 | 1/2009 |
| JP | 2009-075879 | 4/2009 |
| WO | 2005054933 | 6/2005 |
| WO | WO 2006100194 | 9/2006 |

OTHER PUBLICATIONS

Alexander et al., "Revisiting Read Wear: Analysis, Design, and Evaluation of a Footprints Scrollbar", CHI 2009, pp. 1665-1674, Apr. 2009.*

Olsen, "Bookmarks: An Enhanced Scroll Bar", ACM Transactions on Graphics, vol. 1, n. 3, Jul. 1992, pp. 291-295.*

Anand, Paul, "Foundations of Rational Choice Under Risk", Clarendon Press, Oxford University Press 1993, pp. 1-11.

PCT Search Report and Written Opinion, PCT Patent Application No. PCT/JP2011/070675, Dec. 6, 2011, 13 pages.

Wu et al. "User-Preference Based Service Selection Using Fuzzy Logic" (2010) CNSM, pp. 342-345 (http://ieeexplore.ieee.org/stamp/stamp.jsp?arnumber=05691228).

United States Office Action, U.S. Appl. No. 12/826,578, Mar. 28, 2012, 22 pages.

United States Office Action, U.S. Appl. No. 12/879,148, Apr. 19, 2012, 28 pages.

United States Office Action, U.S. Appl. No. 12/826,556, Apr. 27, 2012, 23 pages.

Zadeh, L.A., "Fuzzy Sets", Department of Electrical Engineering and Electronics Research Laboratory, University of California, Berkeley, California, Information and Control 8, pp. 338-353 (1965).

Dempster, A.P., "Upper and Lower Probabilities Induced by a Multivalued Mapping", The Annals of Mathematical Statistics, vol. 38, No. 2 (Apr. 1967), pp. 325-339.

Shafer, Glenn, "A Mathematical Theory of Evidence", Princeton University Press, 1976, pp. 1-15.

Anand, Paul, "Foundations of Rational Choice Under Risk", Clarendon Press, Oxford University Press 1993.

Zadeh, L.A., "Fuzzy Sets as a Basis for a Theory of Possibility", Fuzzy Sets and Systems 100 Supplement (1999), Computer Science Division, Department of Electrical Engineering and Computer Science and the Electronics Research Laboratory, University of California, Berkeley, CA 94720, USA, pp. 9-34.

PCT Search Report and Written Opinion, PCT Patent Application No. PCT/JP2011/064600, Jun. 20, 2011, 12 pages.

PCT Search Report and Written Opinion, PCT Patent Application No. PCT/JP2011/065128, Jun. 24, 2011, 10 pages.

PCT Search Report and Written Opinion, PCT Patent Application No. PCT/JP2011/065236, Jun. 27, 2011, 11 pages.

* cited by examiner

BOOKMARK FUNCTION FOR NAVIGATING ELECTRONIC DOCUMENT PAGES

BACKGROUND OF THE INVENTION

1. Field of the Invention

The present embodiment of the invention relates to portable computing devices and electronic documents, and in particular, user interfaces for the display and manipulation of document pages on portable computing devices.

2. Description of the Background Art

The use of portable computing devices has become commonplace for many users. In addition to having a conventional desktop computer, many users also have some type of portable computing device. Examples of present-day computing devices include electronic devices for reading such as the Reader from Sony Corp., the Kindle from Amazon, and the Nook from Barnes & Noble. Smaller portable computing devices include a plethora of smart phones including the iPhone from Apple Computer Inc., the Blackberry from Research In Motion and the Pre from Palm just to name a few. There have also been increased sales of notebook laptops and tablet computers offering different levels of processing capability and size.

One particular problem with such prior art devices is that they often do not include a keyboard. Even when they have a keyboard for input, it is typically not QWERTY keyboard but instead a 12-key telephone type keypad. Furthermore, most prior art devices do not include a stylus or similar pen-type input device. Therefore, manipulation of documents and the transition between displaying different pages can be difficult. For example, often the user has to transition one page at a time in order to traverse a document. When documents are hundreds of pages, search and document manipulation page by page can be limiting.

Another problem in the prior art is that the display area for the computing devices is often very limited. Since the devices have been constructed primarily for portability, there has been a compromise in design choice that has required the display size to be very small. For example, for smart phones the display size is often less than a small 3"×3"rectangle. Even for e-book readers, the display screen has less than a 7 inch diagonal. Therefore, the display screens typically only accommodate the display of a single page of a document. In general, there is limited if any ability to display multiple pages at the same time. Furthermore, as noted above these devices do not have a keyboard; and therefore, provide simple input buttons that allow the user to move to the next page or the previous page. Since most e-readers in the market do not include a stylus or pen-type input, use of these buttons is the only way to change the page that is being displayed by the reader.

SUMMARY OF THE INVENTION

The present embodiment of the invention overcomes the deficiencies and limitations of the prior art by providing user interfaces for the display and manipulation of document pages on portable computing devices. In particular, the present embodiment of the invention provides a novel graphical user interface that provides a position bar having a manipulatable page position indicator or page box for moving between pages in a document. The graphic user interface is adapted to receive pen input to change the page being displayed by a portable computing device. By manipulation of the location of the page position indicator along the position bar, the user can change the page being displayed. The graphic user interface also provides a bookmarking or referencing function. The page position indicator also allows the user to add reference marks along the position bar. Once set, user interface also interprets input near the reference marks or bookmarks as a command to move to the marked position, and causes the portable computing device to display the marked position and update the user interface.

The system of the present embodiment of the invention generates a novel graphical user interface having a position bar and bookmarking functionality. In one embodiment, the portable computing device includes a processor, a display, stroke capture capability, and a camera and a wireless communication capability. The portable computing device is adapted to receive documents, add stroke annotations to the received documents, add captured image annotations to the received documents, and send the annotated documents.

The portable computing device also includes a presentation module and a position bar and bookmark module. The presentation module is responsible for presenting document pages on the display as well as user interfaces allowing the addition of stroke annotations, the addition of captured images, and other actions to be taken on the documents. The position bar and bookmark module cooperate with the presentation module to generate a navigation area. The navigation area includes a position bar and a page position box that identifies the page of a document that is being shown on the display. The position bar and bookmark module receives stroke input and changes the page of the document being displayed, sets a reference mark, or removes a reference mark in response. The position bar and reference marks generated by the position bar and bookmark module are particularly advantageous because they present an indication to the user as to the size of the document, the relative position within the document of the page being viewed, and an ability to transition between any two pages in the document, especially between pages that have a reference mark associated with them.

The present embodiment of the invention also includes a novel method for changing the page displayed of a document, setting a reference mark, removing a reference mark, and changing to a page having a reference mark.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
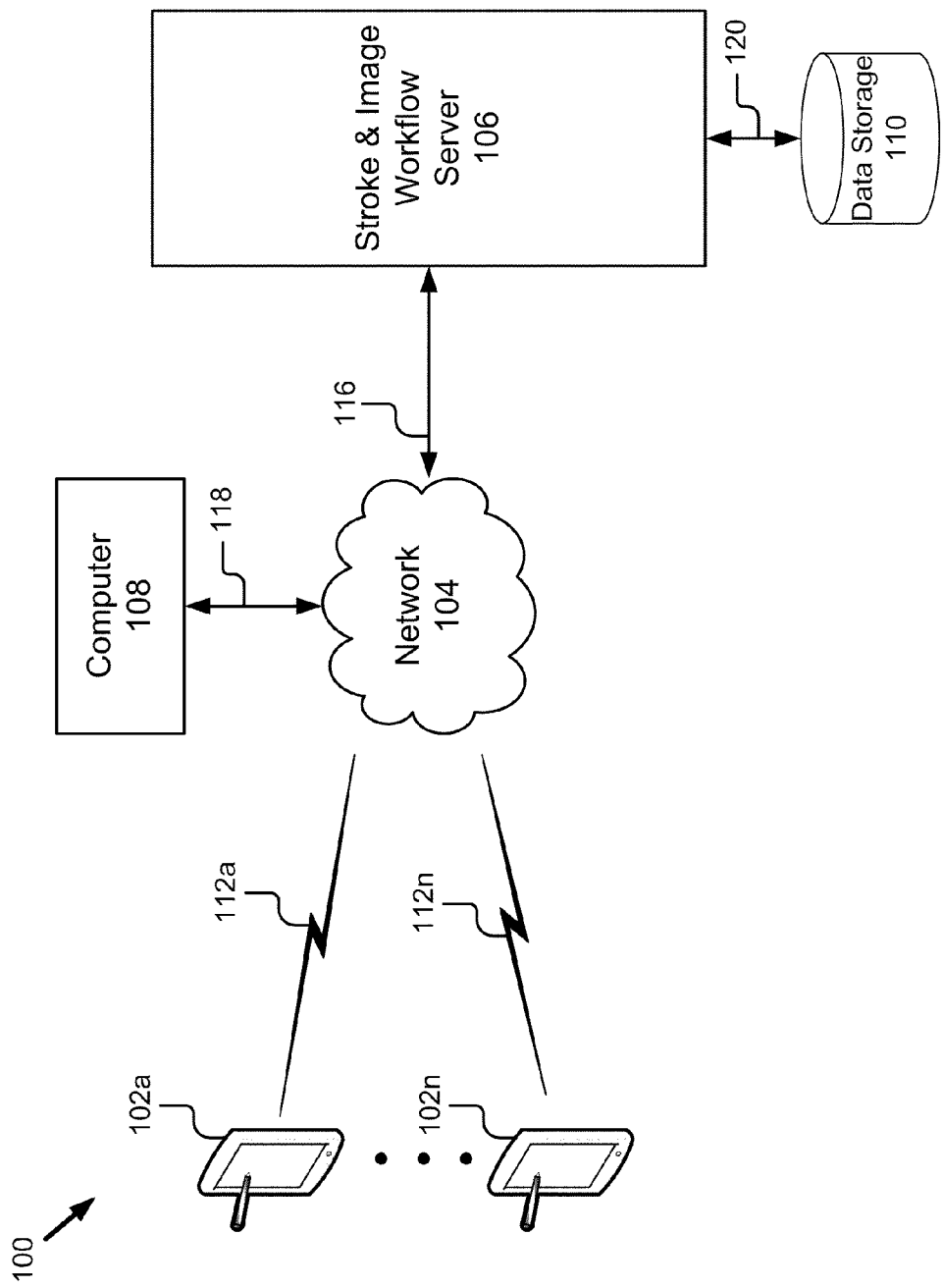
FIG. 1 is a block diagram of an embodiment of a system having a position bar and bookmarking functionality in accordance with the present embodiment of the invention.

A system for generating a novel graphical user interface having a position bar and bookmarking functionality is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present embodiment of the invention is described in one embodiment below with reference to portable computing devices that are exemplified in a hardware and software platform like the Amazon Kindle that utilize electronic paper, e-paper or electronic ink display. However, the present embodiment of the invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present embodiment of the invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of the invention is described with reference to a particular programming language. It will be appreciated that a variety of programming languages may be used to implement the teachings of the invention as described herein.

System Overview

FIG. 1 shows an embodiment of a system 100 for automatic stroke and image based workflow. Referring now to FIG. 1, this embodiment of system 100 comprises: a plurality of portable computing devices 102a-102n, a network 104, a computer 108, a stroke and image workflow server 106 and data storage 110.

The plurality of portable computing devices 102a-102n is wirelessly coupled to the network 104 via respective couplings 112a-112n. In one embodiment, the portable computing devices 102a-102n are portable computing devices including a display, stroke capture capability and a wireless communication capability. The portable computing devices 102a-102n are adapted to receive images (e.g., forms or documents), add stroke annotations to the received images, and send the annotated received images. Embodiments of the portable computing devices 102a-102n will be described in more detail below with reference to FIGS. 2 and 3.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The computer 108 is a conventional type such as personal computer or hardware server. The computer 108 is coupled to the network 104 by signal line 118. In one embodiment, the computer can access and communicate with the stroke and image workflow server 106 to initially input a form for processing or verify processing of a particular form according to workflow. For example, a user may use the computer 108 to input to the stroke and image workflow server 106 a document such as a PDF file for further processing. Similarly, the computer 108 may be the recipient of a completed form after all processing according to its workflow has been completed. Computer 108 may communicate with a verification module 430 (See FIG. 4) of the stroke and image workflow server 106 to verify the status or completion of processing of a particular form. Finally, Computer 108 might operate on an electronic document as an intermediate stage of a workflow, or even contain some of the capabilities of the stroke and image workflow server 106, and communicate directly with portable computing devices 102a-102n.

The stroke and image workflow server 106 is coupled to the network 104 via signal line 116 for communication with the portable computing devices 102a-102n. The stroke and image workflow server 106 includes a document transmission module 408, a workflow module 412, a logging module 416, and a verification module 430 (See FIG. 4). The stroke and image workflow server 106 sends and receives documents from the portable computing devices 102a-102n, maintains a log for verification, and implements a paper like workflow and processing the documents. This is particularly advantageous because the stroke and image workflow server 106 implements paper like workflow for the portable device user and handles the overhead of processing electronic documents so that the processing is invisible to the user.

The data storage 110 is coupled to the stroke and image workflow server 106 via signal line 120. In an alternate embodiment, data storage 110 is coupled to the stroke and image workflow server 106 by the network 104. For example, in such an alternate embodiment, the data storage 110 is an online storage Web service such as Amazon S3. The data storage 110 is a non-volatile memory device or similar permanent storage device and media. Data storage device 110 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs.

Although the system of FIG. 1 shows only one stroke and image workflow server 106, it should be understood that there could be any number of additional workflow servers, for example dedicated to other functions, companies, institutions, organizational structures. A computing device 102a-n may communicate with more than one stroke and image workflow server 106. Particular pages or sections of a document could be associated with different workflow servers.

Also, portions of a compound document can be forwarded rather than sending the entire compound document.

Portable Computing Device 102

Figure 2A:
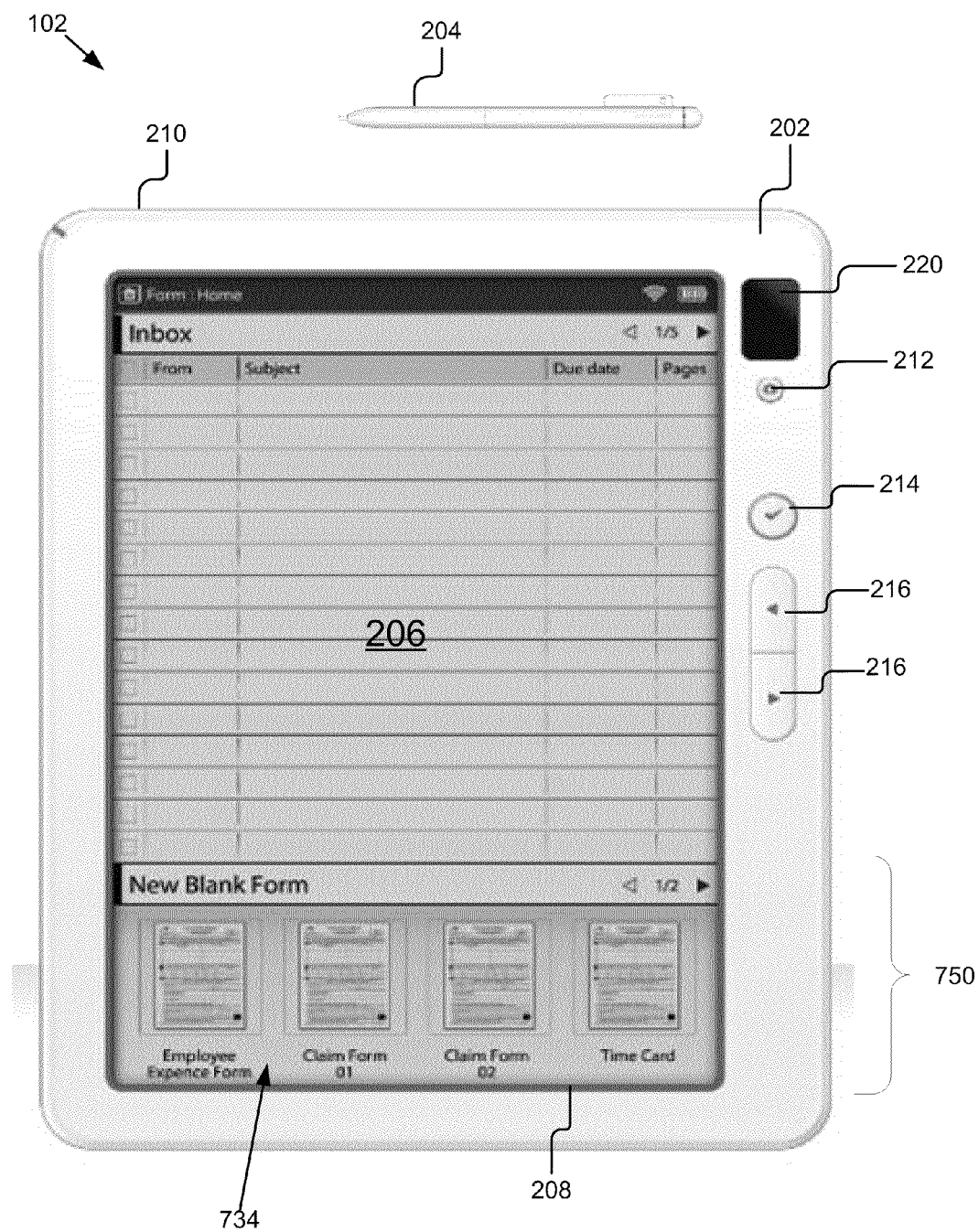
FIG. 2A is a front plane view of an embodiment of a portable computing device in accordance with the present embodiment of the invention.
Figure 2B:
FIG. 2B is a back plane view of the embodiment of a portable computing device of FIG. 2A in accordance with the present embodiment of the invention.
Figure 3:
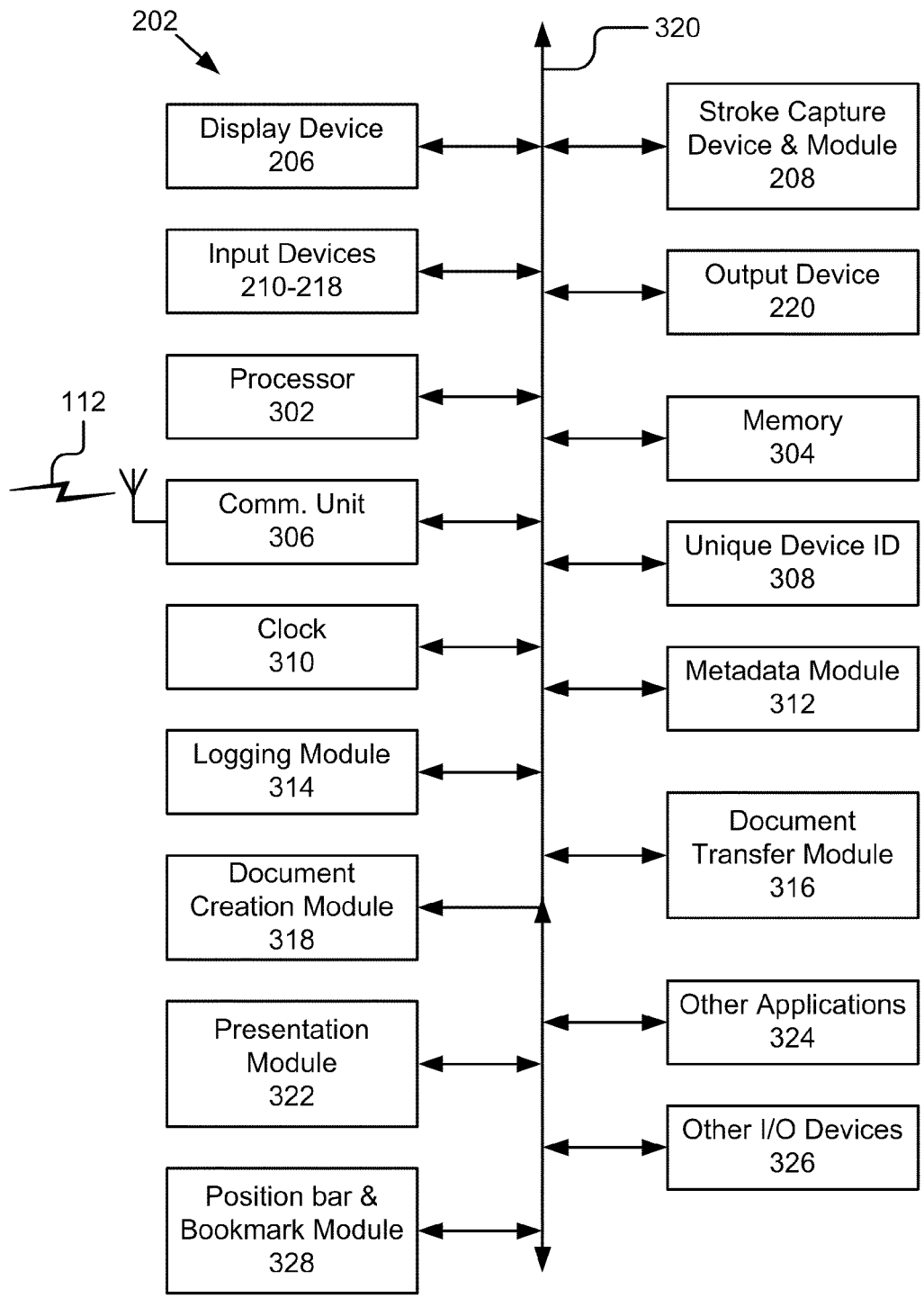
FIG. 3 is a block diagram of the embodiment of the portable computing device in accordance with the present embodiment of the invention.

Referring now to FIGS. 2A, 2B and 3, an embodiment of the portable computing device 102 will be described in more detail. The portable computing device 102 comprises a computing pad 202 and a stylus 204. In an alternate embodiment, the portable computing device 102 may include only a computing pad 202 and users can use their finger or other pen-like object as a stylus. The computing pad 202 displays an image and records any strokes written on the image. The strokes are typically displayed immediately on top of the image, just as if written by pen on paper. The strokes are also typically captured as a sequence of points or segments. Usually some timing information is captured with the strokes and sometimes pressure information is captured. "Pen up" and "Pen down" may also be recorded with the strokes, indicating contact with the pad versus proximity to the pad. In some cases, the stylus 204 may have an identifier or a button or different "ends" and this can also be recorded with the strokes. In some cases, pen or stylus 204 velocity and/or pen acceleration are also recorded. In some cases other aspects of the pen or stylus 204 such as pen rotation or the angle of the pen to the display surface are recorded.

The computing pad 202 comprises a display device 206, a stroke capture device and module 208, a plurality of input devices 210-216, a camera 218, an output device 220, a processor 302, a memory 304, a communication unit 306, unique device identifier storage 308, a clock 310, a metadata module 312, a logging module 314, a document transfer module 316, a document creation module 318, a bus 320, a presentation module 322, other applications 324, and an position bar and bookmark module 328.

Referring now to FIGS. 2A and 2B, one embodiment for the computing pad 202 is shown. In this embodiment, the display device 206 is an electronic paper display such as manufactured and sold by E-ink. In other embodiments, the display device 206 is a liquid crystal display (LCD) or any other similarly equipped display device, screen, or monitor. The display device 206 represents any device equipped to display electronic images and data as described herein. The display device 206 is sized sufficiently to show at least a small 'page' of information. In different embodiments, the display is binary (only two different values for pixels), monochrome (multiple shades of one color), or allows multiple colors and shades. The display device 206 is preferably a light-weight low-power display. In one embodiment, the display device 206 uses reflective light rather than emitting light for use outdoors and uses less power. The display device 206 also has high resolution for displaying information that might otherwise be displayed on paper, but the display device 206 tolerates update speeds much lower than the 60 Hz refresh rates common with LCD displays.

Aligned with the display device 206, there is a stroke capture device 208 such as a digitizing tablet or graphics pad. The stroke capture device 208 is a contact sensing device or a sonic, electromagnetic or light sensing device with receivers that could be above, below, or around the display. The stroke capture device 208 is capable of accepting strokes from the stylus 204 or a finger or other implement. The stroke capture device 208 is a sensor for the stylus 204 and has resolution sufficient to capture recognizable handwriting and printing and other drawings. In one embodiment, display device 206 is equipped with a touch screen in which a touch sensitive, transparent panel covers the screen of display device 206. In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus 204 ID number or type or indication if a button is pressed on a stylus or the stylus has been inverted, e.g. to erase. Some sensors might return multiple points of contact. Some sensors might be able to distinguish between stylus and finger based touch input. The stroke capture device 208 is either part of or adapted to communicate with the stroke capture module 208.

In addition to the stylus 204, the computing pad 202 provides a plurality of input devices 210-216 to input commands. As shown in FIG. 2A, a first button 210 on the top edge of the computing pad 202 when selected turns the computing pad 202 on and off. In one embodiment, the first button 210 can be selected for a short duration to put the computing pad 20 in sleep mode, and depressed for a longer duration to turn the computing pad 202 off. A second button 212 controls the operation of the camera 218 and when selected causes the camera 218 to capture an image. A third button 214 when selected indicates that annotation of a document is complete and the document should be sent by the computing pad 202. A fourth pair of input buttons 216 allows the user to transition to a next page or previous page, respectively, of a document. Those skilled the art will recognize that these input devices as buttons are merely one embodiment for the plurality of input devices 210-216 and that various other configurations of fewer or more buttons or input devices are within the spirit and scope of the present embodiment of the invention. More specifically, in another embodiment, the computing pad 202 has very few (or no) buttons because buttons may interfere with the device being perceived as paper-like.

In such an embodiment, strokes and other metadata will be continuously transmitted as long as there is network connectivity. The completion of a page or set of pages might be indicated by pressing a 'submit' or 'reject' button on the pad, or there may be regions on the displayed page and adding strokes to those regions may cause submission of the appropriate data. Those skilled in the art will recognize that are a variety of different number and configurations for the plurality of input devices 210-216. For example, another configuration includes 1 button for power and one button for submit; a second example has a slider to choose a page among a large number of pages depending on the position of the finger and one or more buttons.

Referring now also to FIG. 2B, the back side of the computing pad 202 is shown. The computing pad 202 includes the camera 218 on the back side and an output device 220 on the front side. As shown in FIG. 2B, the camera 218 is positioned with its lens facing outward on the back side of the computing pad 202 in the upper left-hand corner. The camera 218 is a conventional type such as those available on cell phones or notebook computers. The output device 220 is on the front side of the computing pad 202 and shown in FIG. 2A. The output device 220 is a device for displaying small images and is used as the camera's viewfinder. In one embodiment, the output device 220 is an organic light emitting diode (OLED) and is only operational when the camera is operational. In another embodiment, the output device 220 is used to indicate the status of the device such as: 1) whether the computing pad 202 has power and is operational; 2) whether the computing pad 202 has network connectivity; 3) whether the computing pad 202 is sending or receiving a compound document; etc. Those skilled in the art will recognize that there may be a variety of additional status indicators beyond those listed above that may be part of the output device 220, or that status might be provided through the main display 206.

Referring now also to FIG. 3, the remaining components of the computing pad 202 are described.

The processor 302 comprises an arithmetic logic unit, a microprocessor, a general purpose controller or some other processor array to perform computations, provide electronic display signals to display device 206, and detect and process stroke inputs. The processor 302 is coupled to the bus 320 for communication with the other components of the computing pad 202. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing pad 202 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing pad 202 also includes an operating system executable by the processor such as but not limited to WINDOWS®, MacOS X, Android, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 320 for communication with the other components of the computing pad 202.

The communication unit 306 is coupled to an antenna and the bus 320. An alternate embodiment, the communication unit 306 may provide a port for direct physical connection to the network 104. The communication unit 306 includes a transceiver for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 104 for distribution of files (media objects) using standard network protocols such as TCP/IP, HTTP, HTTPS and SMTP as will be understood to those skilled in the art.

The computing pad 202 includes storage for a unique device identifier 308. The computing pad 202 is coupled to the bus 320 to provide the unique identifier to other components as needed. In one embodiment, the storage is read only memory for storing the unique device identifier 308. In another embodiment, the unique identifier storage 308 is a nonvolatile storage storing a public key-private key pair. In another embodiment, the public key-private key pair is stored within a specialized trusted computing memory integrated with the CPU or main board of the device. It is useful for the computing pad 202 to have a unique identifier that is used to indicate where strokes were recorded or for various communication protocols. In one embodiment, the unique identifier is the hardware MAC address of a network chip in the computing pad 202. The unique identifier 308 may be an internal part of another functional block, such as the communication unit 306, or in nonvolatile storage in memory unit 304. In another embodiment, the unique identifier is a unique ID associated with a memory card on the computing pad 202, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing pad 202 is manufactured with or configured with a private key and the public key disseminated. Then the computing pad 202 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing pad 202.

The clock 310 is a conventional type and provides an indication of local time for the computing pad 202. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software including routines for extracting metadata from a document and storing metadata as part of a document. In one embodiment, the metadata module 312 is instructions executable by the processor 302 to provide the functionality described below with reference to FIGS. 5-9 for accessing both image/page metadata as well as document metadata. In another embodiment, the metadata module 312 has routines for presenting the user interfaces, capturing stroke information, and routing (sending documents from and receiving at the portable computing device 102) documents according to the workflow. In one embodiment, the metadata module 312 is stored in the memory 304 and is accessible and executable by the processor 302. In any event, the metadata module 312 is adapted for cooperation and communication with the processor 302 and other components of the computing pad 202.

The logging module 314 is software including routines for creating and storing local logs in the memory 304, and more particularly, in a nonvolatile storage portion of the memory 304. In one embodiment, the logging module 314 is a set of routines executable by the processor 302 to store metadata in an entangled log at the computing pad 202 and the stroke and image workflow server 106. The logging module 314 is particularly critical to provide verification of workflow completion in transactions. In one embodiment, the logging module 314 also includes routines for publishing or storing in a publicly available location on the network the logs of its particular computing pad 202. The logging module 314 is coupled by the bus 320 to the processor 302, the memory 304, and the communication unit 306.

The document transfer module 316 is software and routines for transmitting and receiving documents from the stroke and image workflow server 106. In other embodiments, the document transfer module 316 sends and receives documents as formatted messages from any other computing device such as but not limited to the computer 108, the stroke and image workflow server 106 or other portable computing devices 102. The document transfer module 316 is coupled by the bus 320 for communication with the processor 302 and the communication unit 306. The document transfer module 316 is responsible for transmitting and receiving the document or formatted message from the computing pad 202 such as by email, file transfer, XMPP or special purpose application.

In a first embodiment, the document transfer module 316 is client software operational on the computing pad 202 that maintains a directory structure that serves as an inbox. The document transfer module 316 moves documents from a corresponding inbox on the stroke and image workflow server 106 to this directory. Once a document in the inbox of the computing pad 202 has been annotated and the user inputs the submit instruction, the document transfer module 316 removes the document from the directory structure and transfers it to the stroke and image workflow server 106 for further processing.

In a second embodiment, the document transfer module 316 is an e-mail client that is capable of receiving and sending e-mails having attachments. The e-mail client is operable on the processor 302. Mail servers commonly use either the POP or IMAP protocols to talk to mail clients, and the computing pad 202 is configured to use either. The messages are in a format the computing pad 202 can directly use, e.g. an attachment of image files. The messages are in a format that requires conversion on the computing pad 202, e.g. a pdf document. Alternatively, a special mail server could provide conversion of messages so that the pad does not need to support multiple formats. In the case of multiple devices being used in a workflow to distribute work that must only be done once e.g. as in the departmental in-box described above, using IMAP is advantageous. Multiple devices 102a-n may be configured as clients with the same IMAP server and 'username.' The group of devices 102a-n might display all forms in the "inbox." Once any user on any device 102a-n marks the form as 'processed' the device moves the message out of the 'inbox' and perhaps into a 'processed' box on the IMAP server. When the other devices 102a-n check the 'inbox' on the IMAP server, they will determine that the pages are no longer present and will no longer display them. When a pad needs to send a page or strokes or multiple pages and strokes, the pad can act as an email client and send mail, perhaps with the pages in a directory structure that has been compressed and combined into a single file.

In a third embodiment, the document transfer module 316 is a routine for performing file transfer. Various file transfer methods can be used to move documents on and off the computing pad 202. The computing pad 202 could run an ftp, http, or webdav server and other devices could push or pull documents on the computing pad 202. The computing pad 202 could also be configured to get or post new documents to an external server, again via ftp, http, rsync, webdav, or another protocol.

In a fourth embodiment, the document transfer module 316 is a client communication program such as for communicating via MMS or on other communications protocols. XMPP, a protocol used in instant messaging, is used to provide document and stroke communication with a pad. Instant messaging protocols are useful because any member of the messaging group can initiate a message, even while another member is transmitting a message. For the computing pads 202 this allows a service to transmit an image for the pad at the same time as strokes are being transmitted from the pad to server. Instant messaging protocols can also be useful if a group of computing pads 202 is sharing a display space and thus all members of the group may be informed of new strokes.

In a fifth embodiment, the document transfer module 316 is a custom application. Of course, information may be transferred to the computing pad 202 with special purpose applications designed to work with the pad using a pad specific API. An instructor might want to "drag and drop" a worksheet onto a graphical representation of a pad without knowing the specific method used to move the file. In one example embodiment, the document transfer module 316 is rsync. Rsync is a data transfer software application for Unix that synchronizes files and directories from one location to another while minimizing data transfer using delta encoding when appropriate. In the embodiments noted above, the document transfer module 316 might be implemented as a store and forward system which opportunistically transmits the documents only when network connectivity is available.

The document creation module 318 is software or routines for creating new documents. The document creation module 318 is operable on the processor 302 and is coupled to the bus 320 for communicating with the other components of the computing pad 202. The document creation module 318 is responsive to signals from the input devices 210-218 or the stroke capture device 208. The document creation module 318 stores template forms of documents in the memory 304. In response to user input, the document creation module 318 accesses the stored template forms and copies the selected one to create a new document from the template form. Once created, the document stored in memory 304, is added to the inbox list maintained by the presentation module 322, and is otherwise editable, manipulatable and transmittable just like any other document.

The bus 320 represents a shared bus for communicating information and data throughout the computing pad 202. The bus 320 may represent one or more buses including an industry standard architecture (ISA) bus, a peripheral component interconnect (PCI) bus, a universal serial bus (USB), or some other bus known in the art to provide similar functionality. Additional components coupled to processor 302 through system bus 320 include the display device 206, the stroke capture device and module 208, the plurality of input devices 210-216, the output device 220, the processor 302, the memory 304, the communication unit 306, the unique device identifier storage 308, the clock 310, the metadata module 312, the logging module 314, the document transfer module 316, the presentation module 322 and the other applications 324. There may also be a plurality of busses in computing system 202, designed to provide the most efficient communications between functional elements.

The presentation module 322 is software and routines for displaying documents and the inbox on the display device 206, and adjusting the display of the image responsive to input from input devices 210-216. The presentation module 322 performs routines that generate the dual mode user interface shown in FIGS. 2, 8 and 9. The presentation module 322 also cooperates with the position bar and bookmark module 328 to generate the novel graphical user interface as will be described below with reference to FIGS. 10-15. In one embodiment, the presentation module 322 is a thin client routine executable by the processor 302 to cause display of the image on the display device 206. The presentation module 322 is coupled by the bus 320 to the display device 206, the processor 302, the memory 304, and the position bar and bookmark module 328.

The other applications 324 include other software and routines executable by the processor 302 for various other types of functionality. In one embodiment, one or more application programs are executed by the processor 302 including, without limitation, word processing applications, electronic mail applications, financial applications, and web browser applications.

The position bar and bookmark module 328 is software and routines for generating a novel graphical user interface that provides a position bar 1002 (See also FIG. 10) for navigating between pages of a document and providing a book marking functionality. The position bar and bookmark module 328 is responsible for generating a graphical user interface that provides the position bar 1002 having a manipulatable page position indicator or page box 1004 for moving between pages in a document. The position bar and bookmark module 328 is adapted to receive pen input from the stroke capture module 208 and interprets the pen input as instructions or commands. By manipulation of the location of the page position indicator 1004 along the position bar 1002, the user can change the page being displayed. In one embodiment, the position bar and bookmark module 328 also provides a bookmarking or referencing function. The position bar and bookmark module 328 is responsive to pen inputs to add, move to, or delete a reference mark 1032 along the position bar 1002. Once the reference mark 1032 is set, the position bar and bookmark module 328 interprets input near the reference marks or bookmarks as a command to move to the marked position. The operation of the position bar and bookmark module 328 will be described in more detail below with reference to FIGS. 6-15.

Finally, the computing pad 202 may include one or more other I/O devices 326. For example, the other I/O devices 326 may include speakers to produce sound, microphones to record sound, a scanner or camera to record documents or images, and other sensors or feedback devices like accelerometers, pager motors, or haptic feedback. Optionally, the other I/O devices 326 may include one or more analog-to-digital or digital-to-analog converters, and/or one or more digital signal processors to facilitate audio processing. These other I/O devices 326 are coupled by bus 320 for communication with the processor 302 and the memory 304. Optionally, a microcontroller may be added as part of other I/O devices 326 to facilitate power systems control, as well as off-load the main processor 302 from lower-speed lesser-important tasks.

Stroke and Image Workflow Server 106

Figure 4:
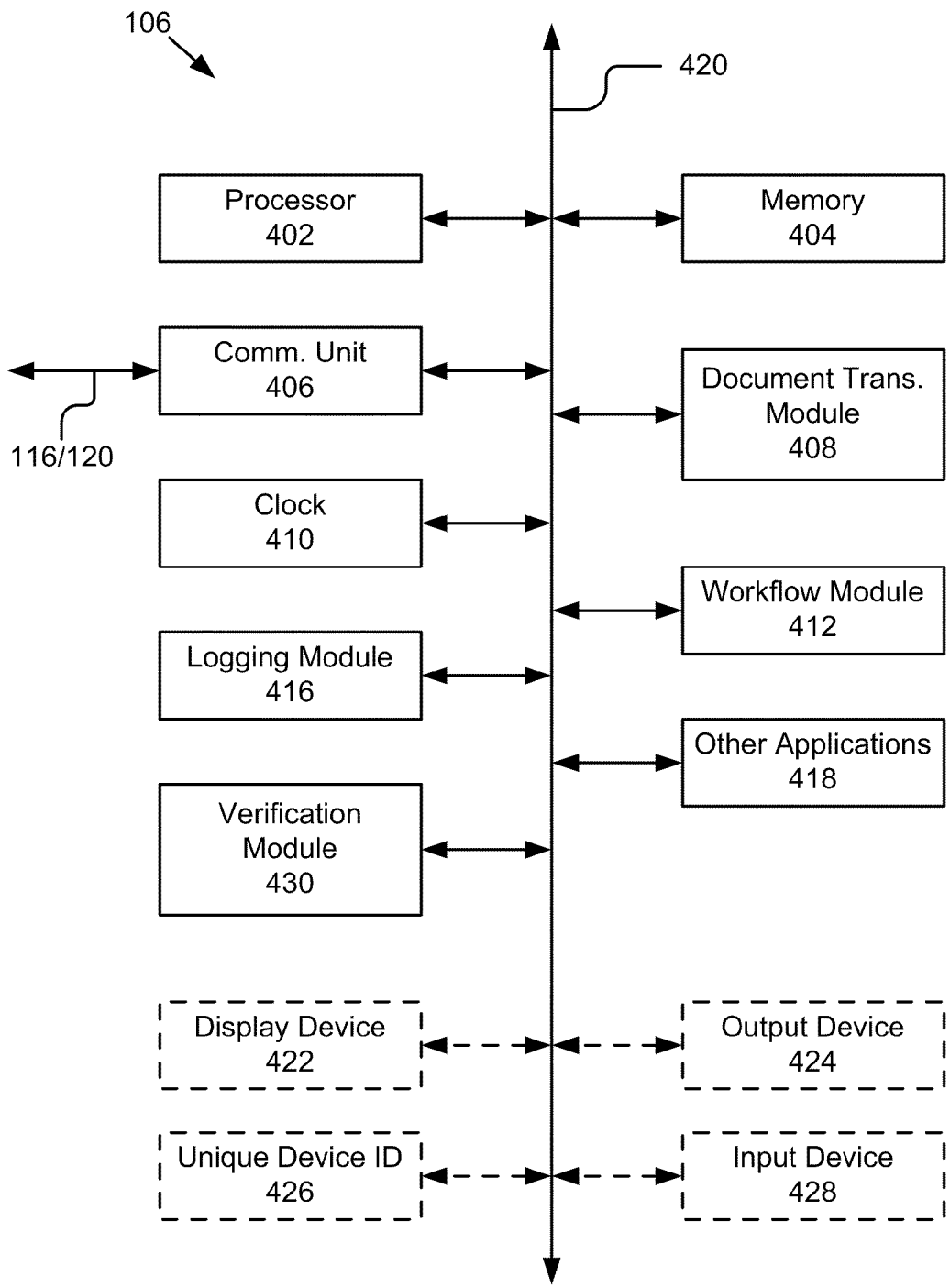
FIG. 4 is a block diagram of an embodiment of the stroke and image workflow server in accordance with the present embodiment of the invention.

Referring now to FIG. 4, an embodiment of a stroke and image workflow server 106 will be described in more detail. The stroke and image workflow server 106 comprises a processor 402, a memory 404, a communication unit 406, a document transfer module 408, a clock 410, a workflow module 412, a logging module 416, other applications 418, a bus 420 and a verification module 430. In an alternate embodiment, the stroke and image workflow server 106 further comprises a display device 422, an output device 424, a unique device ID storage 426 and an input device 428.

Those skilled in the art will recognize that some of the components of the stroke and image workflow server 106 have the same or similar functionality to the components of the computing pad 202 so descriptions of these components will not be repeated here. For example, the processor 402, the memory, 404, the communication unit 406, the document transfer module 408, the logging module 416, the clock 410, the other applications 418, display device 422, output device 424, unique device ID 426 and input device 428 have a similar functionality to the processor 302, the memory 304, the communication unit 306, the document transfer module 316, the logging module 314, the clock 310, the other applications 324, display devices 206, output device 220, unique device ID 308, input devices 210-216 of FIG. 3, respectively. Some differences between the components of the stroke and image workflow server 106 and the computing pad 202 are noted below. For example, the communication unit 406 may couple the stroke and image workflow server 106 to the network 104 in a wired manner instead of wirelessly. The processor 402 is more computationally powerful than the processor 302 as the workflow server 106 likely services numerous portable computing devices 102. The document transfer module 408 is an e-mail server as opposed to an e-mail client. The display device 422 may be a CRT, and the output device 424 is speakers. The input device 428 includes a keyboard and mouse type controller. Those skilled in the art will recognize that there may be a variety of other differences as the components of the stroke and image workflow server 106 acts as a hardware server as opposed to a remote client.

The verification module 430 of the stroke and image workflow server 106 is software and routines for verifying the processing of a document. In one embodiment, the verification module 430 is routines executable by the processor 402 to perform verification of document processing as described below. The verification module 430 is coupled by bus 420 to the processor 402, the memory 404 and the communication unit 406. Note that the verification module 430 might be used independently of the stroke and image workflow server 106. In fact, it might run on the computer 108 for independent verification of documents without need to trust a particular server.

The workflow module 412 of the stroke and image workflow server 106 is software and routines for processing and routing documents or formatted messages. The workflow module 412 creates documents 400 or creates formatted messages. The workflow module 412 also works with the logging module 416 to create a system log (stored in the logging module 416, the memory 404 or the data storage 110) and publishes or makes available that log as needed. The workflow module 412 is also responsible for routing the document or formatted messages on to the next location as part of a processing workflow. In one embodiment, the computing pad 202 returns documents by submitting them or sends reply emails including attachments to the stroke and image workflow server 106, and the workflow module 412 determines the routing and next workflow step. It should be noted that the process of creating a system log by the workflow module 412 can create a entangled log, and that the presences of multiple workflow modules 412 servicing distinct pages of the document greatly increases the difficulty of tampering with the document without being detected. For example, a workflow server 106 might create a notepad document which will be transmitted to all meeting members after the end of a meeting. The notepad document would be created with a "next destination" URL containing a group email address. The workflow server 106 would route the document to each member of the group once the notepad is submitted back to the workflow server 106 by the tablet.

For convenience and ease of understanding, the forwarding of documents and the processing of documents within the workflow is described below as being performed by the workflow module 412 of the stroke and image workflow server 106; however, those skilled in the art will recognize that alternatively the same operations may be performed by the computing pad 202. Alternatively, those skilled in the art will recognize that the document routing process and workflow rules might be implemented by separate servers, instead of being implemented as one integrated server.

Those skilled in the art will recognize that there are a variety of ways that the workflow module 412 of the stroke and image workflow server 106 determines what to do with the document once it has been received from the computing pad 202 (submitted by the computing pad 202). In one embodiment, computing pads 202 are configured to work with a particular stroke and image workflow server 106 and submit a page to the stroke and image workflow server 106; for that page, the stroke and image workflow server 106 then determines the next step based on preprogrammed rules. In one embodiment, the stroke and image workflow server 106 determines how to process the document based upon on metadata stored inside the document itself. The metadata may specify additional processing of the document, how the document is to be routed, and to what other computing devices it is to be routed. For example, an ordered series of email addresses stored as metadata is one example of a workflow where the document will be passed to each successive email address. The metadata may also be provided on an entire document basis or a page basis.

In another embodiment, workflows are specified in the document or in the email (formatted message) in which the document was sent. In the simple case of receiving a document by email, the computing pad 202 returns the completed document to the stroke and image workflow server 106. The stroke and image workflow server 106 then extracts the metadata from the completed document, determines the next step in the workflow, and then sends the completed document to the device (e.g., computer 108) identified to perform the next step in the workflow. In an alternate embodiment, the computing pad 202 returns the completed document by e-mail to the stroke and image workflow server 106, and the e-mail includes the workflow. The stroke and image workflow server 106 determines the next e-mail address in which to send the completed document from the e-mail that included the completed document. In an alternate embodiment, HTTP headers could be used instead of or in addition to e-mail headers. If the documents are being transported in a manner that supports page images, strokes, and metadata, then the metadata can contain the workflow instructions and status. Again, in the simple case, the metadata includes a list of email address and the current step of the workflow.

Document Format

In one embodiment, the basic format or structure of the document is a directory of including one or more files and directories. Inside the directory are a series of page images, as well as optional metadata. The metadata may be associated independently with each page, and/or metadata may be associated with the document as a whole. Such metadata is stored in further nested directories, and is optional. In one embodiment, each pages of the document is stored as an image. This is particularly advantageous because it avoids requiring that the computing pad 202 support a wide range of document formats. Providing pure images, i.e. not files requiring rendering, to the computing pad 202 ensures a consistent view and eliminates problems with inability to render fonts or other graphical commands. In one embodiment, the images are in one of the following file formats: JPEG, JPEG2000, JPM, PNG, PDF, TIFF or simple PBM (portable bit map) file format. Those skilled in the art will recognize that the document directories can be transferred and stored as standard ZIP format archives.

Multiple page image files which share the same initial name segment are considered to be alternate representations of the file, of equivalent quality, and the presentation module 322 may choose the representation most convenient for its use. So, for example, a directory with the following contents: 001.pgm, 001.png, 002.pgm, 002.jpg and 5.pgm would yield a document with three pages. The first page is represented by one of two files, 001.pgm or 001.png. The second page is represented by 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif (Common Intermediate Format) identifies the resolution of the images.

Each of the plurality of images may include associated page or image metadata. The page or image metadata includes stroke data, other metadata and log data. For example, the page or image metadata may also include picture rectangles that identify areas in images at which capture images may be embedded or placed. Furthermore, the entire document includes document metadata. The document metadata includes a document log and other document metadata.

The metadata for the document is represented by files stored in directories, which are associated with either the document as a whole or with individual pages. In one embodiment, the metadata directories have the suffix ".d" as the final pair of characters in the directory name. Information within a metadata directory is stored in a file or subdirectory, which is expected to have a unique name segment. Organizations are encouraged to name them using unique identifiers—for example, the traditional Java reversed domain name method. A metadata directory may itself contain subdirectories, whose contents are ordered and defined according to the creator of that directory. General policy is that applications which do not understand the contents of a metadata file or directory should preserve the contents and should not alter it. As a given metadata file or directory is self contained, there should not be any dependencies between items of metadata unless they are contained in the same directory. Items of metadata are connected either to the document as a whole, or a specific page.

In one embodiment, the document metadata 406 is global metadata and is stored in a directory containing one or more files, named "document.d". This directory is included at the top level directory. It is useful to store a log of actions associated with a document in the document metadata. In one embodiment, the system 100 also stores a version of an "original" document as document metadata. For example if the document was formed from a PDF, Microsoft Word, Microsoft Excel or other document, the original format document may be saved in the metadata directory.

In one embodiment, the page or image metadata is named with the same name segment as the page image, and ends in the extension ".d". For example, if the page image is named "page.001.jpg", the page metadata directory should be named "page.001.d" to indicate that it is associated with that page. In another embodiment, the page or image metadata includes the original image in some format for each page in the page metadata directory. This metadata is created as soon as the document is created e.g. by storing a raster format both at the top level directory and in the page metadata directory, or a copy of the original raster format may be stored when the page image is first changed. In other embodiments, the page or image metadata includes log data. This log data represents a log for changes applied to each page in the metadata directory for the page. The other metadata is used to store any other data related to a particular page or image. For example, if images are added to a page, it is useful to store these added images in the page metadata directory. An image might be added to a page for reasons similar to "stamping" a paper page, e.g. "received" or "submitted" thus providing a visual indication of the status of the page to any reader.

Methods

Referring now to FIGS. 5-7B, the methods of the present embodiment of the invention will be described in more detail.

Figure 5:
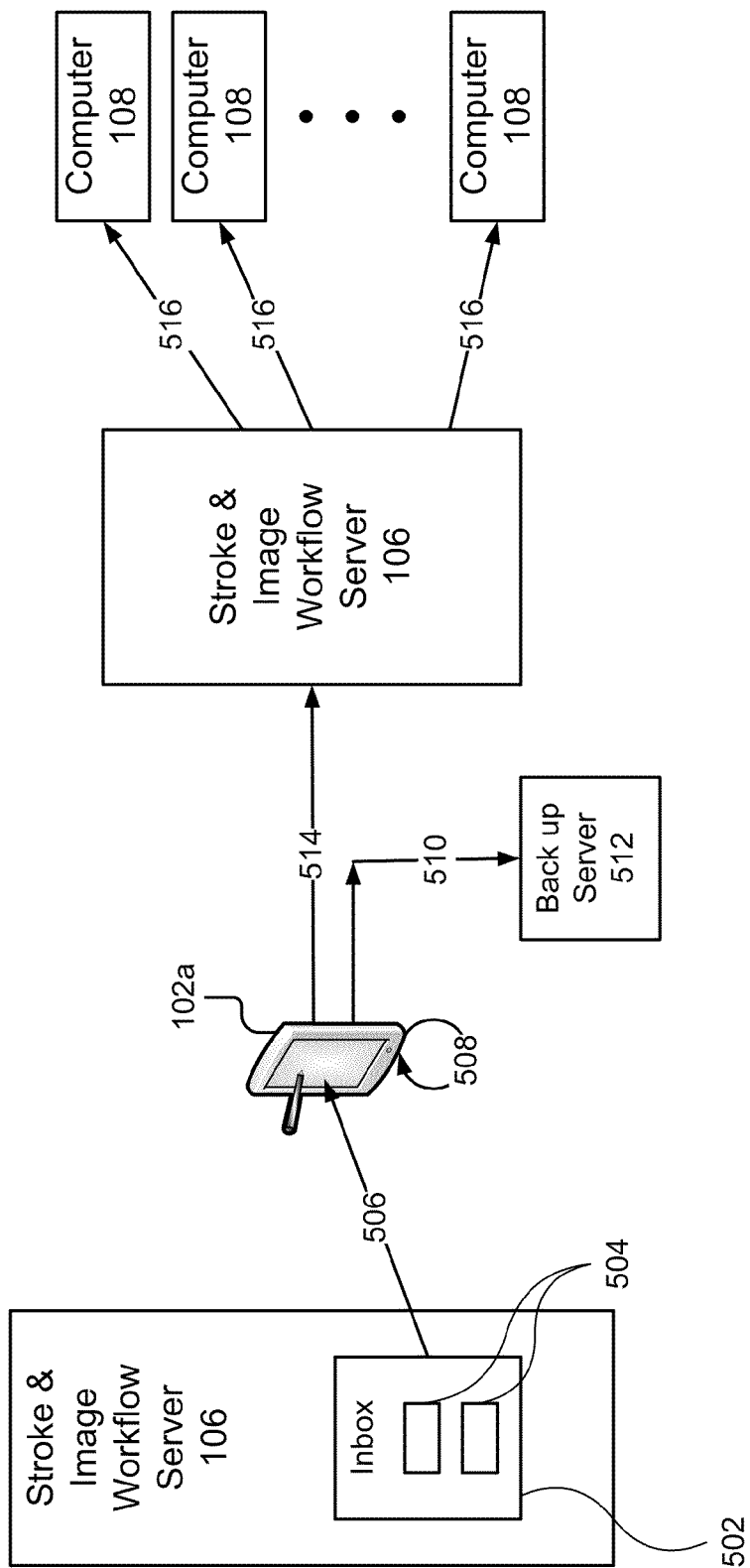
FIG. 5 is a schematic flow diagram illustrating the automatic document processing in accordance with the present embodiment of the invention.

FIG. 5 shows one embodiment of an automatic document processing method in accordance with the present embodiment of the invention. The process begins with the stroke and image workflow server 106 creating and establishing an inbox 502 associated with a portable computing device 102a. The stroke and image workflow server 106 then creates and places one or more documents 504 in the inbox 502 that are scheduled for delivery to the portable computing device 102a. For example, the documents may be forms that the user of the portable computing device 102a needs to complete and return such as a medical information form. The stroke and image workflow server 106 automatically transfers 506 the documents 504 from the inbox 502 to a corresponding inbox (not shown) on the portable computing device 102a. Depending on the embodiment, the transfer of documents may occur at a number of different times: 1) once the documents 504 are placed in the inbox 502; 2) once the portable computing device 102a is coupled for communication with the stroke and image workflow server 106; 3) at periodic times, such as 15 minute intervals; or 4) various combinations of the above. Once the documents 504 have been transferred 506 to the portable computing device 102a, the portable computing device 102a is used to annotate the documents 504 and add strokes and other information to them. The annotations are added to the document 504 and the document 504 is stored back on the portable computing device 102a as depicted by line 508. In one embodiment, the information and the annotations added to documents 504 are backed up 510 off of the portable computing device 102a to a backup server 512. This transfer of documents can occur at times similar to those described above. Those skilled in the art will recognize that this step of backing up annotations made with the portable computing device 102a may be performed at regular intervals such as every 10 minutes or longer to preserve power of the portable computing device 102a. In yet another embodiment, the backup interval can be set by the user. Once the user has completed adding annotations to a particular document 504 and the document 504 is ready for submission, the user inputs a submit instruction and the annotated document 504 is transferred 514 from the portable computing device 102a to the stroke and image workflow server 106. Once the annotated document 504 is received at the stroke and image workflow server 106, it is stored, logged and the next step in the workflow process is determined. Based on the determination of where the document 504 should be sent to next, the stroke and image workflow server 106 transmits 516 the document to the determined device (e.g., the other computers 108). While FIG. 5 illustrates the plurality of computers as being computer 108, those skilled in the art will recognize that computer 108 represents a variety of different vendors capable of performing additional processing or annotation to the document 504.

The present embodiment of the invention is particularly advantageous because of the level to which it automatically processes forms or documents and advances them in a workflow. FIG. 5 described above illustrates how the present embodiment of the invention is automatic in that forms or documents are automatically advanced in the workflow and sent from the stroke and image workflow server 106 to the portable computing devices 102a-n. Once the forms or documents have been annotated by the user, they are sent back to the stroke and image workflow server 106 with the user merely having to input a single "submit" command or instruction. This automatic level processing of forms or documents is particularly advantageous because it makes the portable computing devices 102a easy and simple enough to use for every day document processing. Moreover, the present embodiment of the invention lends itself to providing the user with an experience or interaction that very closely mimics the use of pencil and paper, thereby requiring little or no learning curve.

The present embodiment of the invention is also advantageous because it provides a series of user interfaces that are very simple and easy-to-use. In particular, the user interfaces that will be described below provide two modes of interaction with the computing pad 202. In a first mode (inbox mode), a user interface (See 800 in FIG. 8) presents an inbox that lists all the documents that are modifiable, editable or annotable by the user. In this first mode, the user is limited to three actions: 1) re-sort the order in which the documents are listed; 2) select a document for editing; 3) create a new document for editing. In a second mode (document annotation mode), a user interface (See 900 of FIG. 9) is presented that displays an image of a document. Again, the user is limited to three actions: 1) add stroke or annotation to the document; 2) add a picture to the document; 3) transition to display a different page of the image or transition back to the inbox mode. The present embodiment of the invention is particularly advantageous because it limits the number of decisions required by the user. By providing only two interfaces in which to interact with documents and constraining the number of actions that may be taken in each mode, the user interface is elegantly simple and efficient. This allows the user interfaces to be adopted easily with little or no learning curve, provides a user experience that mimics the interaction with paper, and integrates the collection of information with automatic processing within a workflow. Furthermore, the present embodiment of the invention provides a single command workflow routing.

Figure 8:
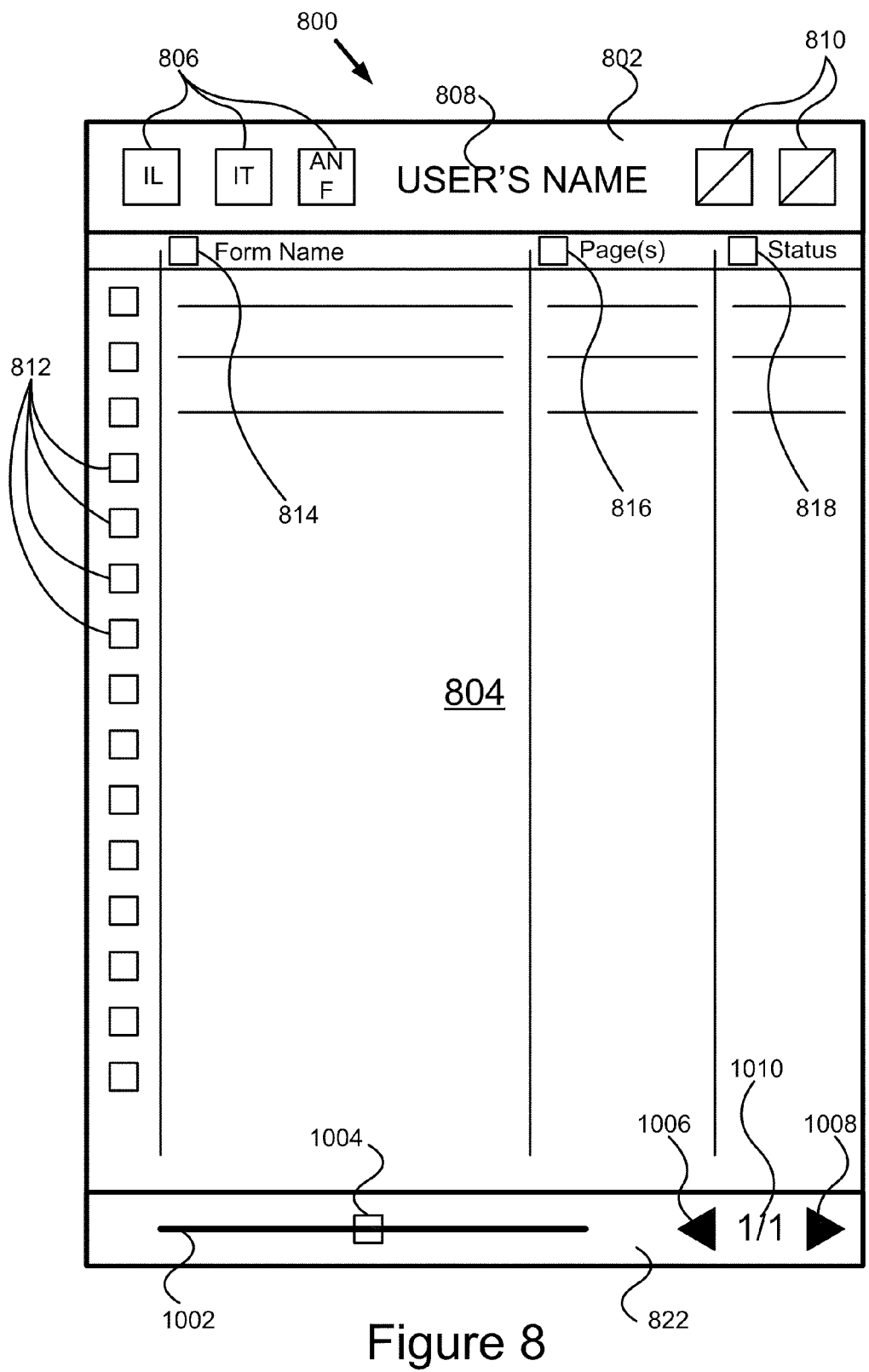
FIG. 8 is a graphic representation of one embodiment of the inbox user interface in accordance with the present embodiment of the invention.

Referring now to FIG. 8, one embodiment for the inbox view or user interface 800 is shown. The inbox view 800 is a window including a menu area 802, a display area 804 and a navigation area 822.

The menu area 802 includes a plurality of buttons 806, a label 808 for the computing pad 202, and status indicators 810 for the computing pad 202. The buttons 806 allow the user to modify how the documents are listed in the inbox or to create a new document. For example, one button 806 labeled "IL" (Inbox List) presents the documents in the inbox as a list as shown in FIG. 8. Another button 806 labeled "IT" (Inbox Thumbnail) causes the display area 804 to show the documents as thumbnail images of the first page of each document. A third button 806 labeled "ANF" (Add New Form) toggles between the user interface of FIG. 2A that shows selectable templates of new documents that can be created along the bottom of the window and the display shown in FIG. 8 in which there is not an area that allows the user to create new documents. The label 808 is some indication of the owner of the computing pad 202 such as the user's name. The status indicators 810 are icons used to show the status of the computing pad 202. For example, different icons such as a series of bars, a series of radio slats or a battery may be shown to indicate the status of the Wi-Fi signal, a 3G signal (or Bluetooth), or a battery respectively.

The display area 804 includes a plurality of selection buttons 812, a series of columns, and a series of buttons 814, 816, 818 and labels. The present embodiment of the invention advantageously lists the documents each having a corresponding row with a series of columns similar to the presentation of e-mails in inbox. Each of the documents (row) has a corresponding selection button 812. When the user selects the selection button 812, the computing pad 202 transitions from the inbox view 800 of FIG. 8 to the form view 900 of FIG. 9 with the selected document being displayed. Each row has four columns, one for the selection button 812, one for the form name, one for the number of pages in the document, and finally one for the status of the document. An area proximate the top area of the display area 804 provides a series of column headers. In one embodiment, the three columns each have a selection button 814, 816, 818 and a corresponding label. For example, the second column includes the selection button 814 and the label "form name," the third column includes the selection button 816 and the label "Page(s)," and the fourth column includes the selection button 818 and the label "Status." In one embodiment, only one of the three selection buttons 814, 816, 818 is selectable at any given time. Based on the selection of the user the documents listed and shown in the display area 804 are sorted according to the attribute of the selection button 814, 816, 818. In other words, the listed documents are sorted either according to form name, number of pages or status. The status of a document is its status in the work flow or its status of review or editing. The status of any document in the inbox can be one of the following and they may be provided with an icon visually corresponding to their status: 1) submitted and uploaded; 2) submitted (but not uploaded); 3) edited; 4) read (but not edited) and 5) new (not opened).

The navigation area 822 includes controls to navigate between pages and a page number indicator 1010 as to what page of the document is being displayed. For the example document shown in FIG. 8, a first page of the one-page document is being displayed as specified by the page number indicator 1010. The navigation area 822 includes a position bar 1002 or slider bar with a page position indicator or page box 1004. In this embodiment, the position bar 1002 is a horizontal line with a beginning point at the leftmost position representing a first page in the document and an ending point at the rightmost position representing the last page in the document. Positions on the line between the beginning point and the endpoint are linearly associated with a corresponding page of the document. The position of the page position indicator 1004 relative to the position bar 1002 is used to show the relative page position within the document of the current page that is being displayed on the user interface 800. In this embodiment, the page position indicator 1004 is shown as the square or rectangle indicating the page position within the document. Those skilled in the art will recognize that in other embodiments the page position indicator 1004 may be other shapes such as a circle, oval, triangle or any other shape. In other embodiment, the page position indicator 1004 may be any other visual representation that distinguish the page position indicator 1004 from the position bar 1002 in the navigation area 822. Throughout this application the terms "page position indicator" and "page box" will be used interchangeably and to mean the same thing, namely, a graphic indicator identifying the page position on the page position bar 1002 corresponding to the page position within a document of the page that is being presented on the display 206 of the computing pad 202. The navigation area 822 also includes a pair of buttons 1006, 1008 to navigate to the previous page or next page, respectively. The operation of the position bar 1002 and the page position indicator 1004 will be described in more detail below with reference to FIGS. 6-15.

Figure 9:
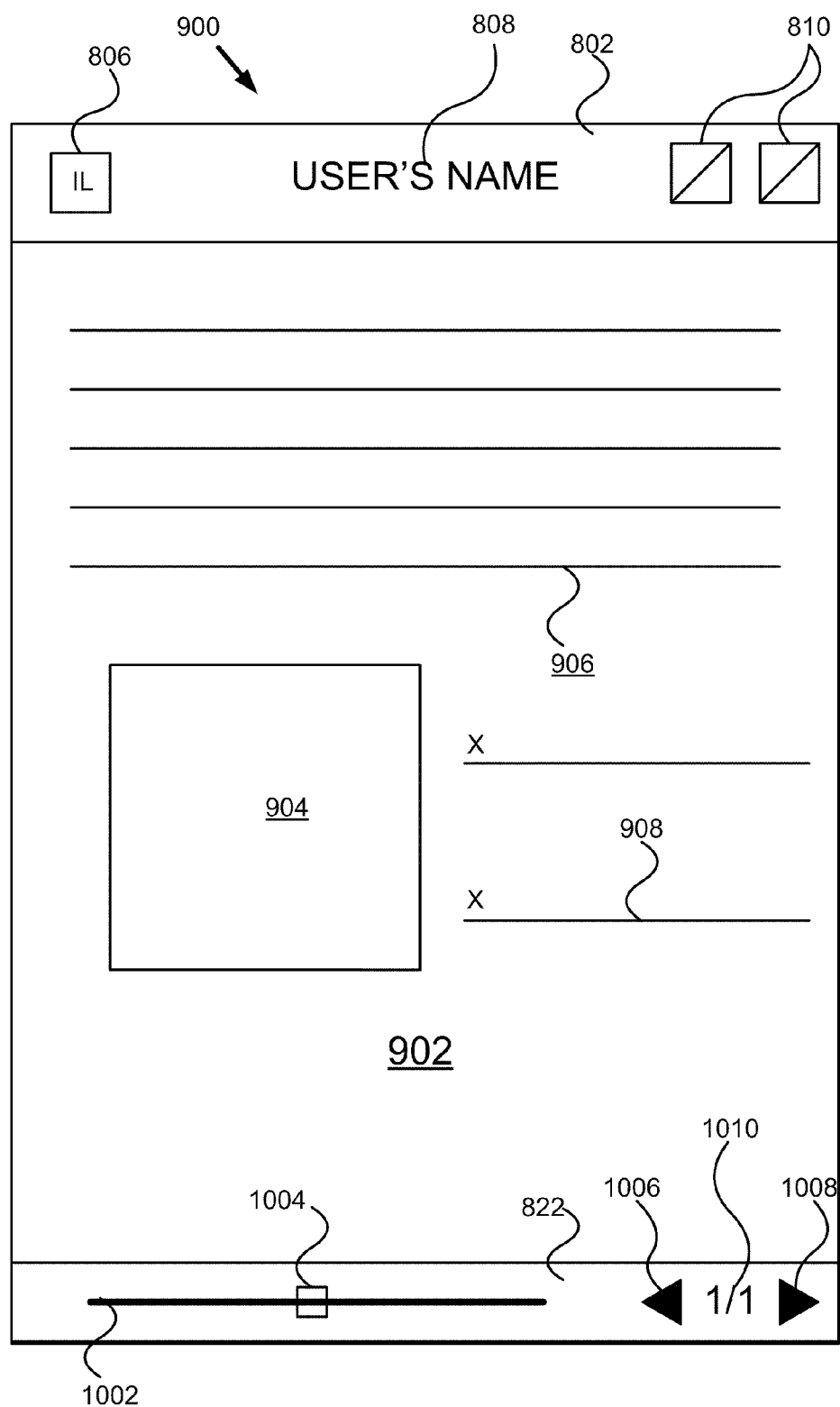
FIG. 9 is a graphic representation of an example form displayed in one embodiment of the form view or user interface in accordance with the present embodiment of the invention.

Referring now to FIG. 9, one embodiment for the form view or user interface 900 is shown. The form view 900 is a window including a menu area 802, a display area 902 and a navigation area 822. The menu area 802 of the form view 900 is similar to that described above for the inbox view 800; however, the menu area 802 of the form view 900 only includes a single button 806 that transitions from the form view 900 to the inbox view 800. The navigation area 822 of the form view 900 is similar to that described above for the inbox view 800 so that description will not be repeated here.

The display area 902 of the form view 900 is used to display an image of a page of the document. FIG. 9 shows an example form with a plurality of areas such as an area for inserting an image 904, an area 906 for filling in response to questions, and areas for signatures 908. During display of the form view 900, the user can add annotations to any of the above areas 904, 906 and 908 simply by moving the stylus 204 over the display 206. Those skilled in the art will recognize that any number of different types of forms or documents may be displayed and that these forms may have various different pages including text-only, or text in combination with any of the areas 904, 906 and 908. This user interface is purely advantageous because it allows the user to process the document by annotating it in the form view 900 just as the user would with a piece of paper. Once the user has completed all her annotations to the document, she needs only hit the submit button 214, and the computing pad 202 automatically records these annotations, stores the document of the computing pad 202, forwards the document to the stroke and image workflow server 106, and the stroke and image workflow server 106 completes additional processing on the annotated document as necessary. For example, in one embodiment when the form view 900 is being displayed and the user selects or presses the submit button 214, the computing pad 202 determines the document that is currently being displayed in the form view 900, creates an annotated document by adding any strokes or other input that have been received by the computing pad 202 for this document (they may or may not have been stored at the computing pad 202), then sends the annotated document to the stroke and image workflow server 106. In an alternate embodiment, the computing pad 202 determines not only the document but also the page that is currently being displayed in the form view 900, and only submits the page of the document to the stroke and image workflow server 106. In yet another embodiment, the computing pad 202 determines whether it has received any stroke input or other input that can be added to the document to create an annotated document. If the computing pad has received some stroke input or other input, the process continues as described above by creating an annotated document and sending it from the computing pad 202 to the stroke and image server 106. On the other hand, if the computing pad 202 has not received stroke input or other input the computing pad 202 displays an error message to the user indicating that no editing has been done on the document being displayed in the form view 900; and therefore, no document or annotated document will be sent to the stroke and image workflow server 106. In yet another embodiment, the computing pad 202 ensures that any document presented in the form view 900 has been completed to the level desired by the recipient. For example, a document may require that a particular number of fields out of all fields in the document be completed before the document may be submitted. In such a case, the computing pad 202 determines whether the number, length, and other features of the input data are sufficient enough to meet the requirements of the document being presented in the form view 900. If so, the computing pad 202 creates an annotated document from the requisite input and sends the annotated document to the stroke and image workflow server 106. If not, the computing pad 202 displays one or more error messages indicating that required fields of the document have not be completed and therefore the document cannot be (and will not be) submitted. The error messages may range from just a general error message to more particular error messages that identify to the user what field of the form page must be completed before it can be submitted. Those skilled in the art will recognize from the description of above that there are a variety of modifications to the different enforcement scenarios that may be applied by the computing pad 202 before submission of the document is executed by the computing pad 202.

Referring now back to FIG. 2A, an embodiment of a new form view 734 is shown. The new form view 734 is similar to the inbox view 800 described above. However, the new form view 734 also includes a bottom region 750 including a label, a navigation area and a new form template area. Within the new form template area are forms that are selectable by the user. In response to selection of one of the forms in the template area, the computing pad 202 creates a new form of that type that was selected and adds it to the list maintained by the inbox. FIG. 2A shows the inbox with no documents and prior to user selection of a form from the template area. In an alternate embodiment, each thumbnail image of a form template may include a checkbox proximate the upper left corner of the thumbnail. In response to user selection of the checkbox the computing pad 202 performs the steps of creating and adding a new document to the inbox.

Position Bar and Bookmarking Module 328

Figure 6:
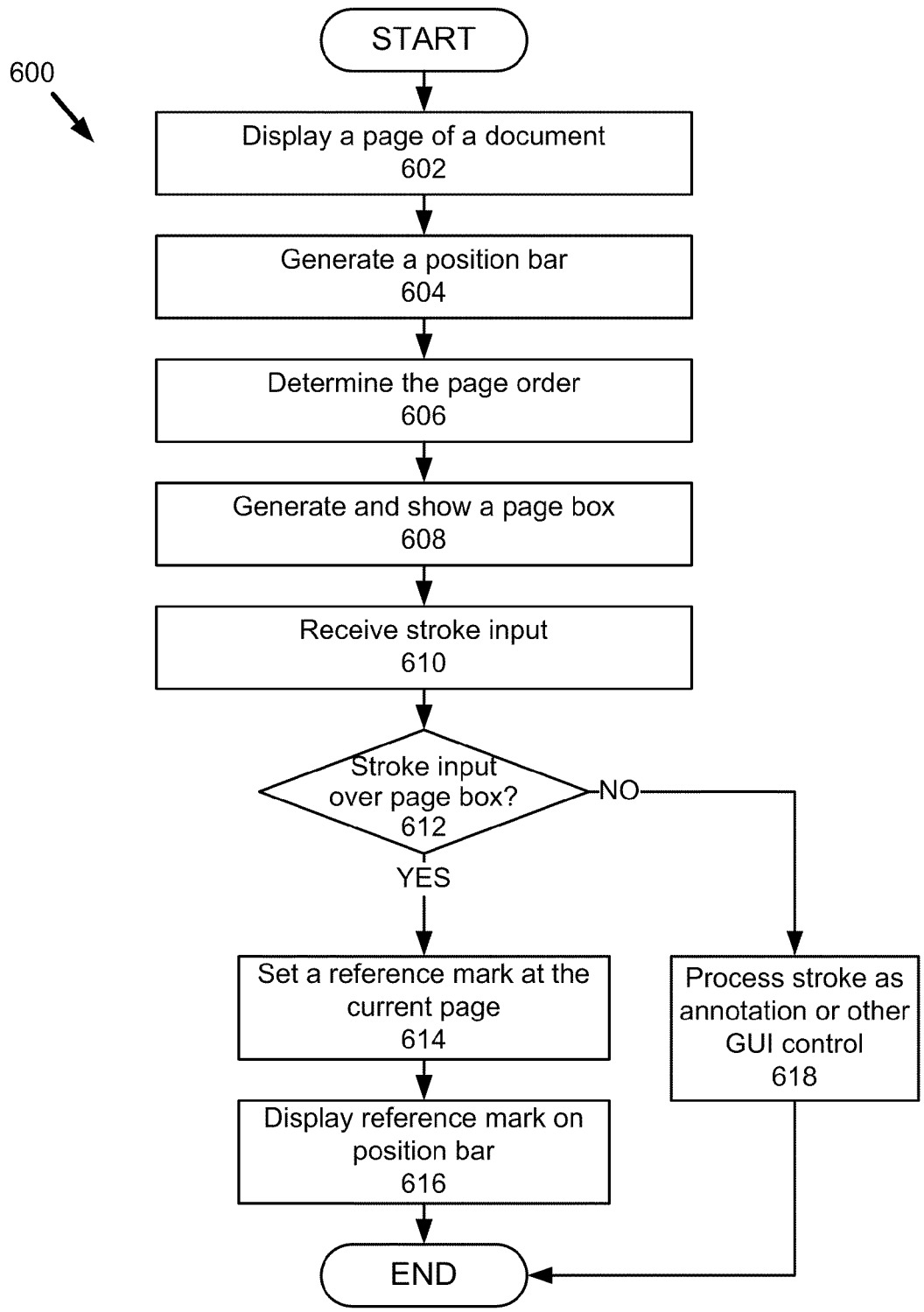
FIG. 6 is a flow chart illustrating a first embodiment of a method for generating a position bar and setting a reference mark in accordance with the present embodiment of the invention.

Referring now to FIG. 6, a first embodiment of a method 600 for generating a position bar 1002 and setting a reference mark 1032 in accordance with the present invention is described. For the discussion below, it is assumed that most if not all the steps of the method 600 are performed by processor 302 in cooperation with the presentation module 322 and the position bar and bookmark module 328. Those skilled in the art will recognize that other devices may perform the steps of this method 600 such as when the present embodiment of the invention is implemented on a desktop computer.

Figure 10:
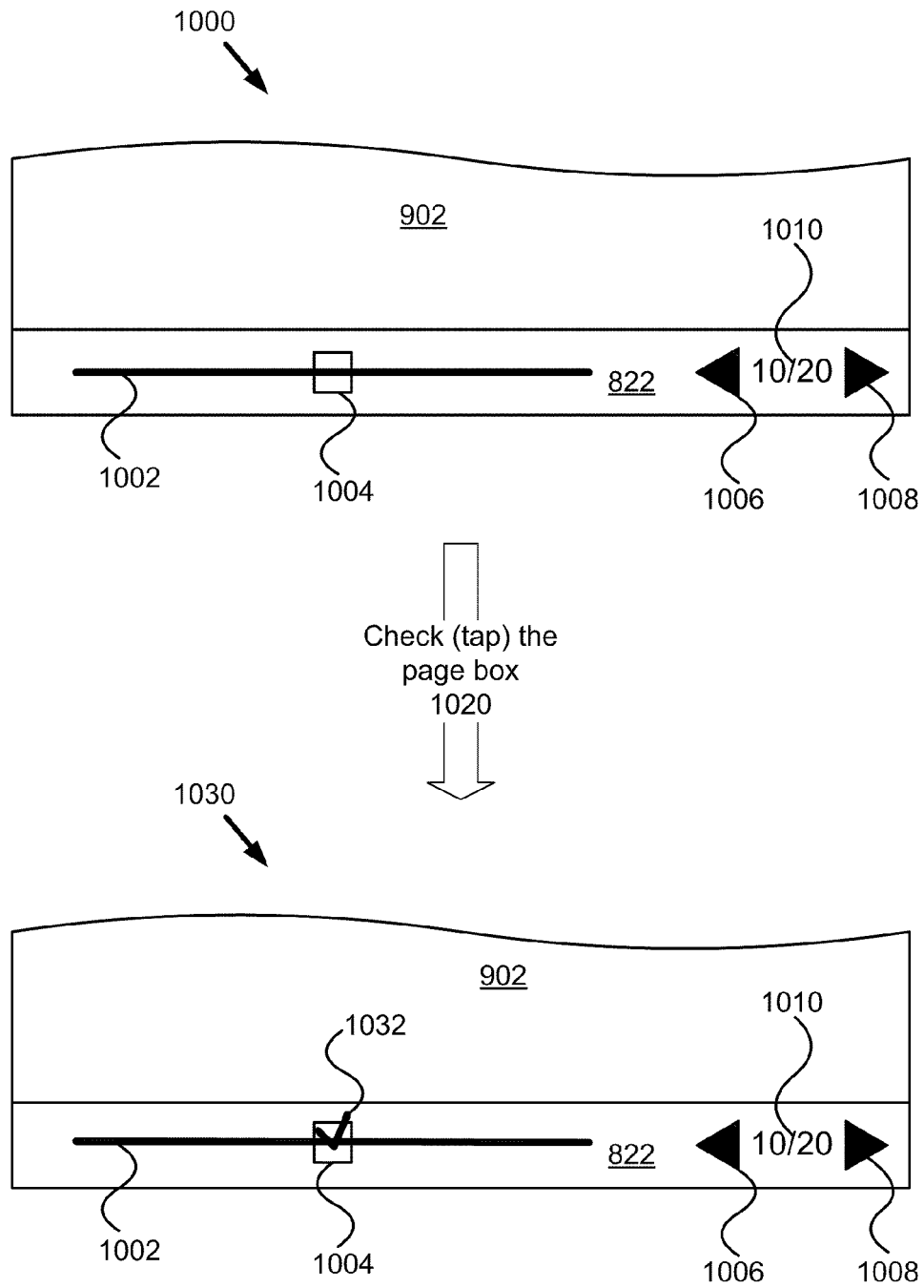
FIG. 10 is a graphic representation of a partial section of one embodiment of a user interface showing a navigation area before and after selection of a page box in accordance with the present embodiment of the invention.

The method begins by displaying 602 a page of a document. For example, a page of a document may be displayed in the user interface 800 as shown and described above with reference to FIG. 8. Next the method 600 generates 604 a position bar 1002. Referring now also to FIG. 10, one embodiment for the position bar 1002 is shown. The position bar 1002 is preferably a horizontal line as has been described above in the discussion of the position bar and bookmark module 328. The position bar 1002 represents a linear approximation of the pages in the document. A leftmost position on the position bar 1002 represents the first page or the beginning of the document and a rightmost position on the position bar 1002 represents the last page of the document being displayed on the computing pad 202. In one embodiment, the length of the position bar 1002 on the display 206 is fixed regardless of how many pages are in the document being viewed. In another embodiment, the length of the position bar 1002 varies depending upon how many pages are in the document being viewed. For example, if the document has only a few pages such as less than 10, then the position bar 1002 would have a length approximately 25% of its maximum. However if the document has over 100 pages, then the position bar 1002 would have a maximum length of several inches. Next, the method 600 determines 606 the number and order of pages being displayed for the document. Additionally, the method 600 determines the page number of the current page that is being displayed on the computing pad 202. Next, the method generates 608 a page position indicator 1004 and displays it at a location on the position bar 1002 based upon the page number and the number of pages determined in step 606. For example, if the document has a total of 20 pages and page 10 is being displayed on the computing pad 202, the user interface generated by the position bar and bookmark module 328 would be similar to the partial interface 1000 shown in the top half of FIG. 10.

The method 600 continues to present the user interface 1000 and the user interacts with the user interface 1000 to navigate to different document pages. The user enters commands to the user interface 1000 by inputting strokes. However, the user can also add stroke annotations to documents in other areas (not shown) of the user interface 1000. The method 600 continues by receiving 610 a stroke input. Then the method 600 determines 612 whether the stroke input was made over or near the page position indicator 1004. In one embodiment, the stroke capture module 208 can identify the location at which the stroke was input. If any part of the stroke input is in or near the page position indicator 1004, it is considered over the page position indicator 1004. The stroke capture module 208, for example can identify within 1 to 2 pixels the precise location of the stroke input. This location from the stroke capture module 208 can be compared with the location at which the page position indicator 1004 is being displayed by the presentation module 322 to determine whether a stroke input was made over the page position indicator 1004. In another embodiment, while not literally over the page position indicator 1004, the position bar and bookmark module 328 will interpret stroke input within an error factor, $\epsilon$, as being over the page position indicator 1004. For example, $\epsilon$ may have a value of 0-5 pixels. The present embodiment of the invention advantageously interprets the placement of a stroke over the page position indicator 1004 as an indication that the user wants to add a reference mark 1032. Thus, simply by tapping the page position indicator 1004 with the stylus 2004, the user can add reference marks 1032 to the position bar 1002. This makes it very easy for the user to set reference marks 1032 and later use those reference marks 1032 to jump between different pages in the document. If the method determined that the stroke input was over the page position indicator 1004, the method proceeds to set 614 a reference mark 1032 at the current page. Then the user interface 1030 is updated to show the reference mark 1032 on the position bar 1002 at the same location as the page position indicator 1004. Once the display and the user interface have been updated, the method is complete and ends. On the other hand, if the method determined that the stroke input was not over a page position indicator 1004, then the method 600 continues in step 618. In step 618, the stroke input is processed as either a stroke annotations or a stroke input to another GUI control unrelated to page navigation. After the stroke input has been added either as an annotation or processed as a good GUI control command, the method is complete and ends.

Figure 7A:
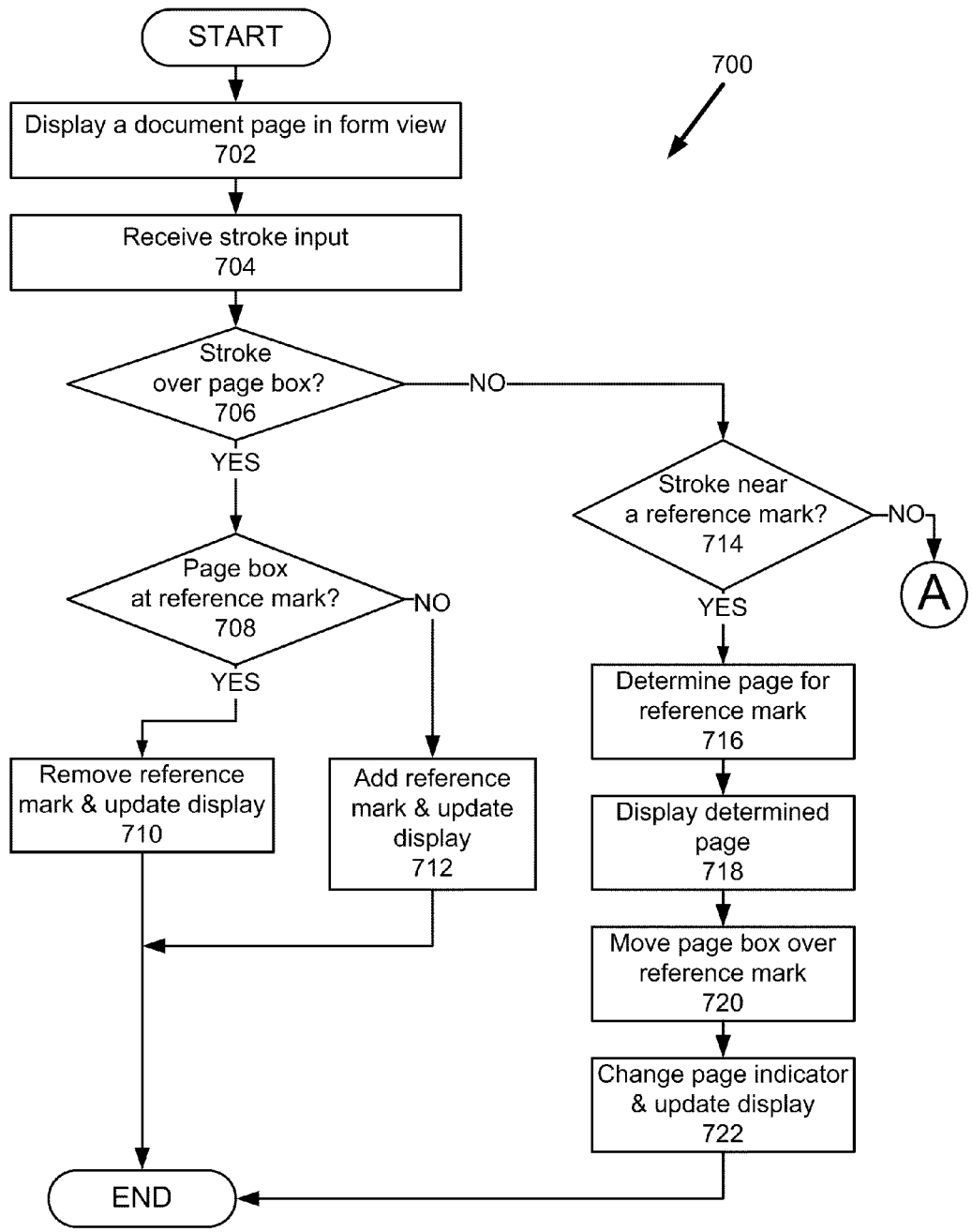
FIGS. 7A and 7B are a flow chart illustrating an embodiment of a method for generating and interacting with a position bar with bookmarking capability in accordance with the present embodiment of the invention.
Figure 7B:
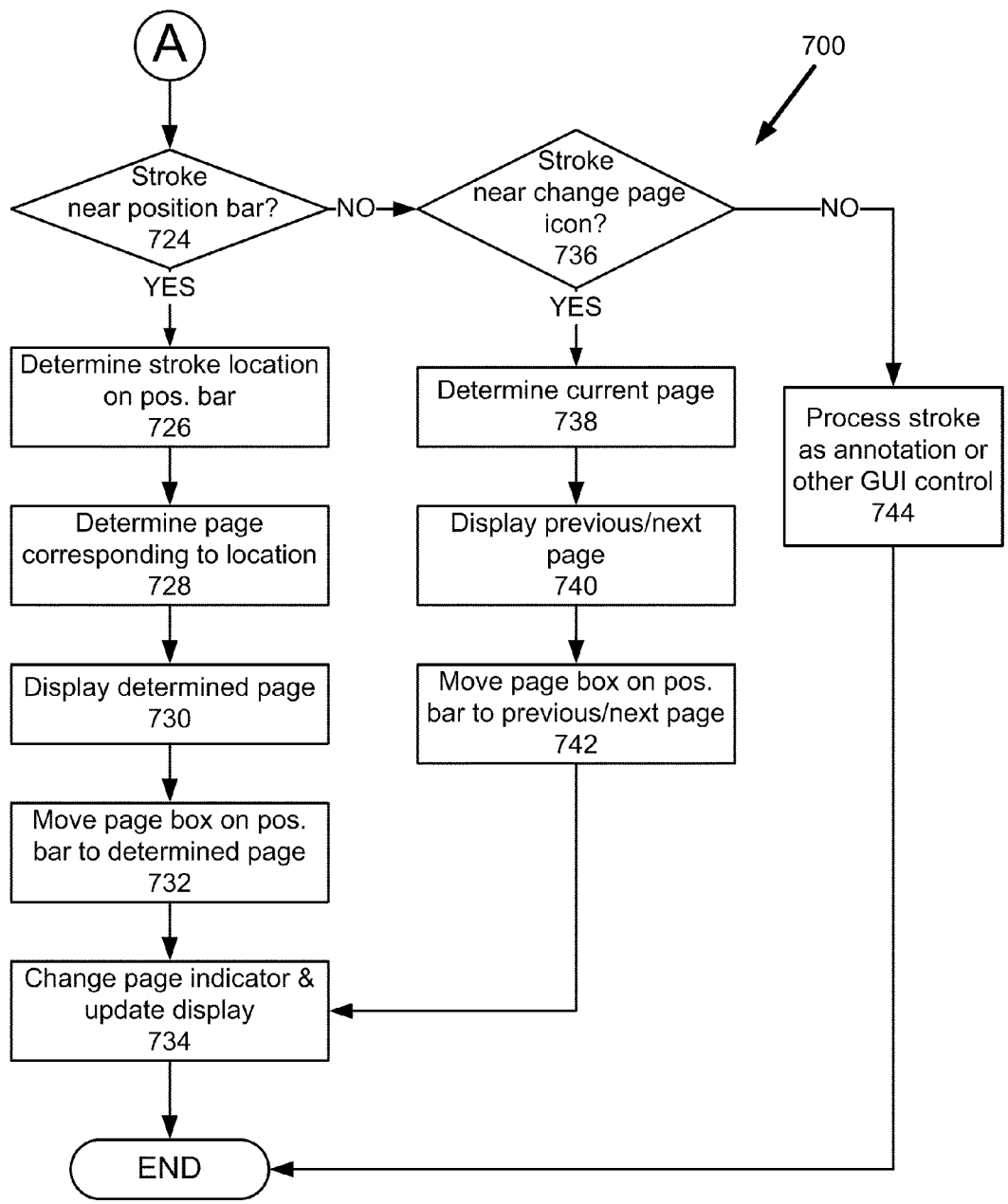

Referring now to FIGS. 7A and 7B, a second embodiment of a method 700 for generating and interacting with the position bar 1002 that has bookmarking capability in accordance with the present invention will be described. The method begins by displaying 702 a page of a document such as in the form view interface 900. The step of displaying 702 is similar to steps 602, 604, 606, 608 of FIG. 6 so that description will not be repeated here. Next, the method 700 receives 704 stroke input. This is similar to step 610 of FIG. 6 described above. The method 700 then determines 706 whether the stroke input received in step 704 is over or near a page position indicator 1004. The present embodiment of the invention provides a graphical user interface in which it is very easy to add or remove reference marks 1032. If the user taps onto a blank page position indicator 1004, then the position bar 1002 and bookmark module 328 interprets that input gesture as an indication that the user wants to add a reference mark 1032 at the current position of the page position indicator 1004. Similarly, if the user taps onto a page position indicator 1004 that is positioned over an existing reference mark 1032, then the position bar 1002 and bookmark module 328 interprets that gesture as an indication that the user wants to remove the existing reference mark 1032. Since it has been determined that the stroke input is over a page position indicator 1004, the method 700 continues to determine 708 whether the page position indicator 1004 resides over or at an existing reference mark 1032. This determination is made in a manner similar to the determination of whether a stroke is over a page position indicator 1004, but instead by comparing the position of the reference mark 1032 and the position of the page position indicator 1004. If the page position indicator 1004 is over a reference mark 1032, the method 700 continues to remove 710 the reference mark 1032 and update the display of the position bar 1002 and the page position indicator 1004 by removing the checkmark that represents the reference mark 1032 from the display. After the display has been updated, the method is complete and ends. On the other hand, if the page position indicator 1004 is not over a reference mark 1032, the method 700 continues to add 712 a new reference mark 1032 and update the display of the position bar 1002 and the page position indicator 1004. Specifically, the interface 1030 is updated to add a checkmark at the current position of the page position indicator 1004 that represents the reference mark 1032. After the display has been updated, the method is complete and ends.

If in step 706, the method determined that the stroke was not over a page position indicator 1004, the method 700 proceeds to step 714. In step 714, the method 700 determines whether the stroke input was near a reference mark 1032. The present embodiment of the invention advantageously makes it easy for a user to jump between a currently displayed page and a page that has previously been viewed and marked with a reference mark 1032. The user need only tap the stylus 204 in the proximity of the display area where the reference mark 1032 is presented. In one embodiment, the stroke input is considered "near" the reference mark 1032 if it is within 3 to 5 pixels of the position of the reference mark 1032. In other embodiments, the definition of "near" is set to a default value and that default value may be modified by the user by interacting with the position bar and bookmark module 328. For example, if the user often views documents with hundreds of pages, the definition of "near" may be set to be within a very close proximity of the reference mark (e.g., less than two pixels) since a small distance represents a large number of pages. In cases where a given position might be within the standard distance of more than one reference mark, the algorithm chooses the closest reference mark. However if the user often views documents that are 20 pages or less, the definition of "near" may have a greater value in terms of number of pixels (e.g., the range of 7 to 15 pixels) since a larger distance represents only a few pages. If the method 700 determines that the stroke input is near the reference mark 1032, the method continues by determining 716 the page of the document associated with the reference mark 1032. Then the method 700 displays 718 the page of the document associated with the reference mark 1032. The method 700 also moves 720 the page position indicator 1004 over the reference mark 1032, changes 722 the page number indicator 1010 to reflect the new page that is being displayed, and updates the user interface 1202 to reflect that a new page is being displayed. After the display 206 of the computing pad 202 has been updated to show the page of the document associated with the reference mark 1032 and the user interface 1202 has been updated, the method is complete and ends.

Referring now to FIG. 7B, the remaining steps in the method 700 will be described. If the method 700 determined in step 714 that the stroke input was not near a reference mark 1032, then the method transitions from step 714 of FIG. 7A to step 724 of FIG. 7B. In step 724, the method 700 determines whether the stroke input is near the position bar 1002. The definition of "near" here has the same definition of "near" as has been described above. It also has the same degree of customization as has been described above to accommodate the user's style of interaction with the stylus 204 and the computing pad 202. If the method 700 determined that the stroke input was near the position bar 1002, the process continues by determining 726 a location of the stroke input on the position bar 1002. The method 700 then determines 728 the page corresponding to the location. The determination 726, 728 of the stroke location and the corresponding page are determined as has been described above. The method 700 continues by displaying 730 the page that was found as corresponding to the location on the position bar 1002 for the stroke input. The method 700 completes by moving 732 the page position indicator 1004 on the position bar 1002 to the location corresponding to the stroke input, changing 734 the page number indicator 1010 and updating the display.

On the other hand, if in step 724 the method 700 determined that the stroke input was not near the position bar 1002, the method 700 determines 736 whether the stroke input was near either change page icon 1006, 1008 in the navigation area 822. If so, the method 700 determines 738 the current page, and displays 740 the previous or next page depending on the page icon 1006, 1008 that was selected. The method continues by moving 742 the page position indicator 1004 on the position bar 1002, to the previous or next page again depending on the page icon 1006, 1008 that was selected. Finally, the page number indicator 1010 is changed 734 and the display is updated after which the method is complete and ends.

If it was determined in step 736 that the stroke was not near a change page icon, then the stroke input must either be a stroke annotation that needs to be added to the document shown in the display area 804 or a control signal or command for another GUI other than the navigation area 822. The stroke input is then processed 744 as a stroke annotation to be added to the document of a control signal for another GUI and the process is complete and ends.

Referring now to FIGS. 10-15, the novel user interfaces of the present embodiment of the invention will be shown and described in more detail. In FIGS. 10-13, each figure includes a pair of graphic representations of a portion of the user interface. The top user interface in each figure shows the status of the navigation area 822 prior to receiving stroke input. The bottom user interface in each figure shows the state of the navigation area 822 after receiving and processing stroke input. Those skilled in the art will recognize that the user interfaces shown in FIGS. 10-15 show only a portion of the entire interface. While the embodiments of the inbox view interface 800 and the form view interface 900 position the navigation area 822 at the bottom of the display area 206, those skilled in the art will recognize that the navigation area 822 of the present embodiment of the invention could be positioned at other locations such as the top of the display or the side of the display. Whether it is the inbox view interface 800 or the form view interface 900, the navigation area 822 has functionality for page transitions and bookmarking that will be described below.

FIG. 10 shows a graphic representation of one embodiment of a portion of the display area 902 and the navigation area 822 of the form view 900. The user interface 1000 shows the display area 902 and the navigation area 822 before and after selection of a page position indicator 1004 in accordance with the present embodiment of the invention. As shown in FIG. 10, the navigation area 822 includes the position bar 1002, the page position indicator 1004, a previous page button or icon 1006, a page number indicator 1010 and a next page button or icon 1008. The position bar 1002 is a line that extends laterally over most of the navigation area 822. The page position indicator 1004 is movable along the longitudinal axis of the position bar 1002 and its position reflects the linear position within the document of the current page. On the right-hand side of the navigation area 822, the previous page button 1006, the page number indicator 1010 and the next page button 1008 are positioned in that order left to right. In this embodiment, the page number indicator 1010 indicates the current page as well as a total number of pages, and the two values are separated by slash.

FIG. 10 illustrates the user interface of the present embodiment of the invention after a reference mark 1032 has been added. The interface 1000 is shown with the navigation area 822 indicating that page 10 of the 20 page document is being shown in display area 902. The position bar 1002 is a linear representation of the pages of the document. Since page 10 is being displayed in the display area 902, the page position indicator 1004 is positioned near the middle of the position bar 1002. The interface 1000 provides a simple and easy way for a user to navigate between pages. The user can either tap on button 1006 or button 1008 to cause the display to advance to the previous or next, respectively, page of the 20 page document. The user can also use the stylus 204 (not shown in FIG. 10) to drag the page position indicator 1004 to another location along the position bar 1002 and the page corresponding to the new location of the page position indicator 1004 will be presented in display area 902.

Figure 14:
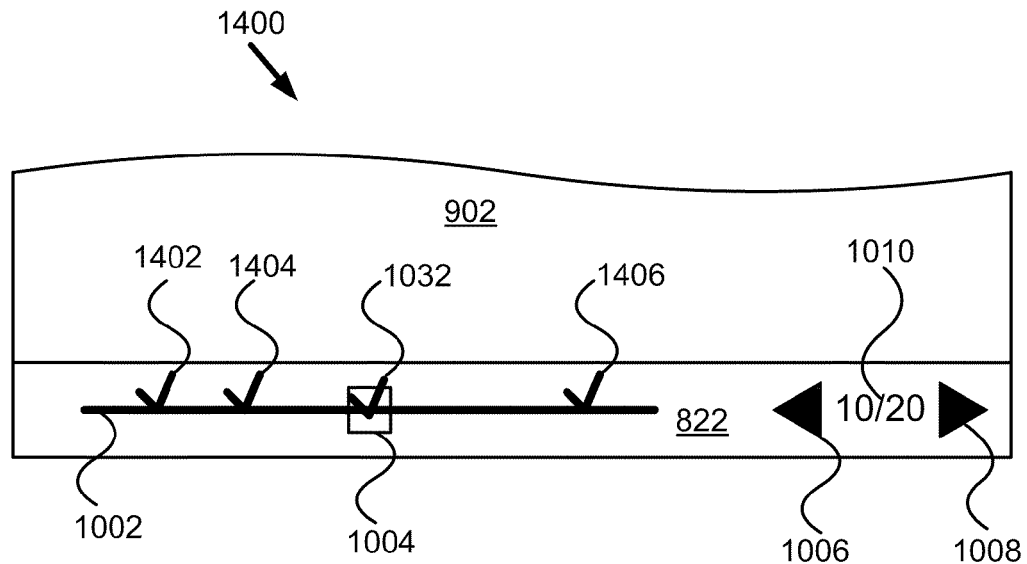
FIG. 14 is a graphic representation of a partial section of one embodiment of a user interface showing a navigation area having a plurality of reference marks in accordance with the present embodiment of the invention.

A particular advantage of the present embodiment of the invention is the ability to set reference marks 1032. As shown in FIG. 10, the transition between interface 1000 and interface 1030 shows the change in the interface in response to the addition of a reference mark 1032. The interface 1000 on top shows the status of the display prior to the addition of reference mark 1032. When the user wants to add a reference mark 1032, the user taps 1020 the stylus 204 on or near the page position indicator 1004. The stroke input of a tap on or near the page position indicator 1004 initiates the process described above with reference to FIG. 6. The end result is the interface 1030 shown at the bottom of FIG. 10. As can be seen, after the reference mark 1032 has been added, the page position indicator 1004 is shown with a checkmark at the location on the position bar 1002 of the current page. The checkmark provides the user with visual feedback that a reference mark 1032 has been added. Those skilled in the art will recognize that checkmark is just one way in which visual feedback may be provided and that a variety of other symbols, marks, color, highlighting, formatting may be used to show the existence of a reference mark 1032. Although only a single reference mark is shown in FIG. 10, those skilled in the art will also recognize that the process described below with reference to FIG. 6 and shown in FIG. 10 can be repeated any number of times to add a plurality of reference marks 1032 to add various locations along the position bar 1002. Referring now also to FIG. 14, one example interface 1400 having a plurality of reference marks 1402, 1404, 1032, 1406 is shown. The reference marks can be added by the user to the position bar 1002 at any page that the user is interested in viewing later or to which the user may return.

Figure 11:
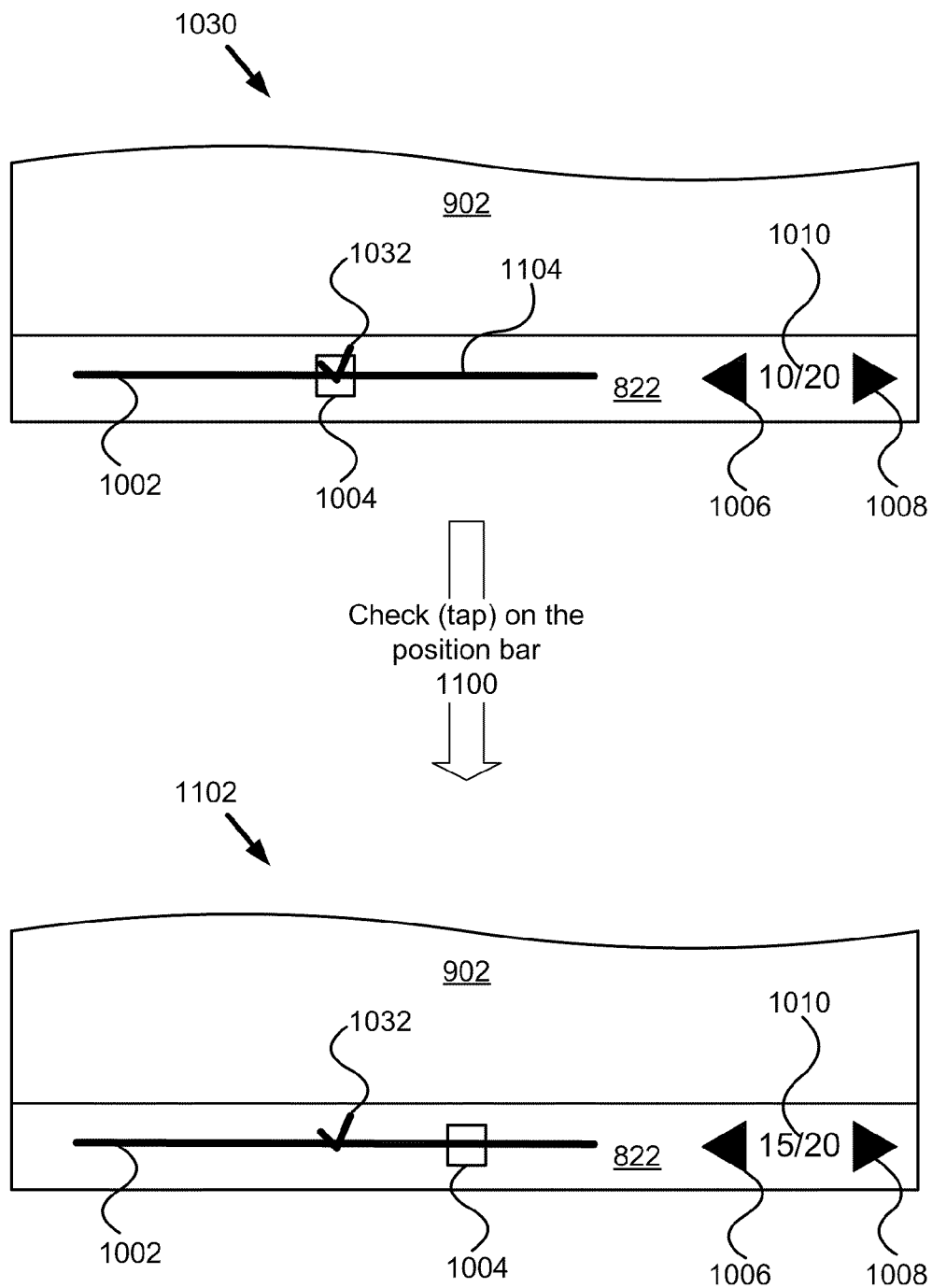
FIG. 11 is a graphic representation of a partial section of one embodiment of a user interface showing a navigation area before and after selection of a position bar in accordance with the present embodiment of the invention.

Referring now to FIG. 11, another advantage provided by the position bar 1002 of the present embodiment of the invention is shown. The top interface 1030 is identical to that shown at the bottom of FIG. 10 in which a user has just set a reference mark 1032. Since the reference mark 1032 at a position corresponding to the current page being displayed in the display area 902 has been set, the user can now transition to view other pages of the document. If the user wants to view other pages of the document, the user needs only input a stroke (tap, checkmark or other similar pen type gesture) at some location on the position bar 1002. Since the position bar 1002 is a linear representation of the pages in the document, the user can estimate a location on the position bar 1002, where the leftmost position corresponds to the first page of the document and the rightmost position corresponds to the last page of the document, that corresponds to the page the user is interested in. In this example, the user has tapped at location 1104 on the position bar 1002 of interface 1030 that is about 25% of the distance from the rightmost end of the position bar 1002. In response, the present embodiment of the invention executes the processes and methods described above with reference to FIG. 7 to produce the interface 1102 in the bottom half of FIG. 11. As can be seen by comparing interface 1102 with interface 1030, the position of the page position indicator 1004 is moved along the position bar 1002 to correspond to a location at which the user tapped the position bar 1002 of interface 1030. Although not shown, the display area 902 is also modified to show page 15 of the 20 page document in interface 1102 as opposed to page 10 in interface 1030. Finally, the page number indicator 1010 is updated to reflect that page 15 is being displayed and now shows "15/20".

Figure 12:
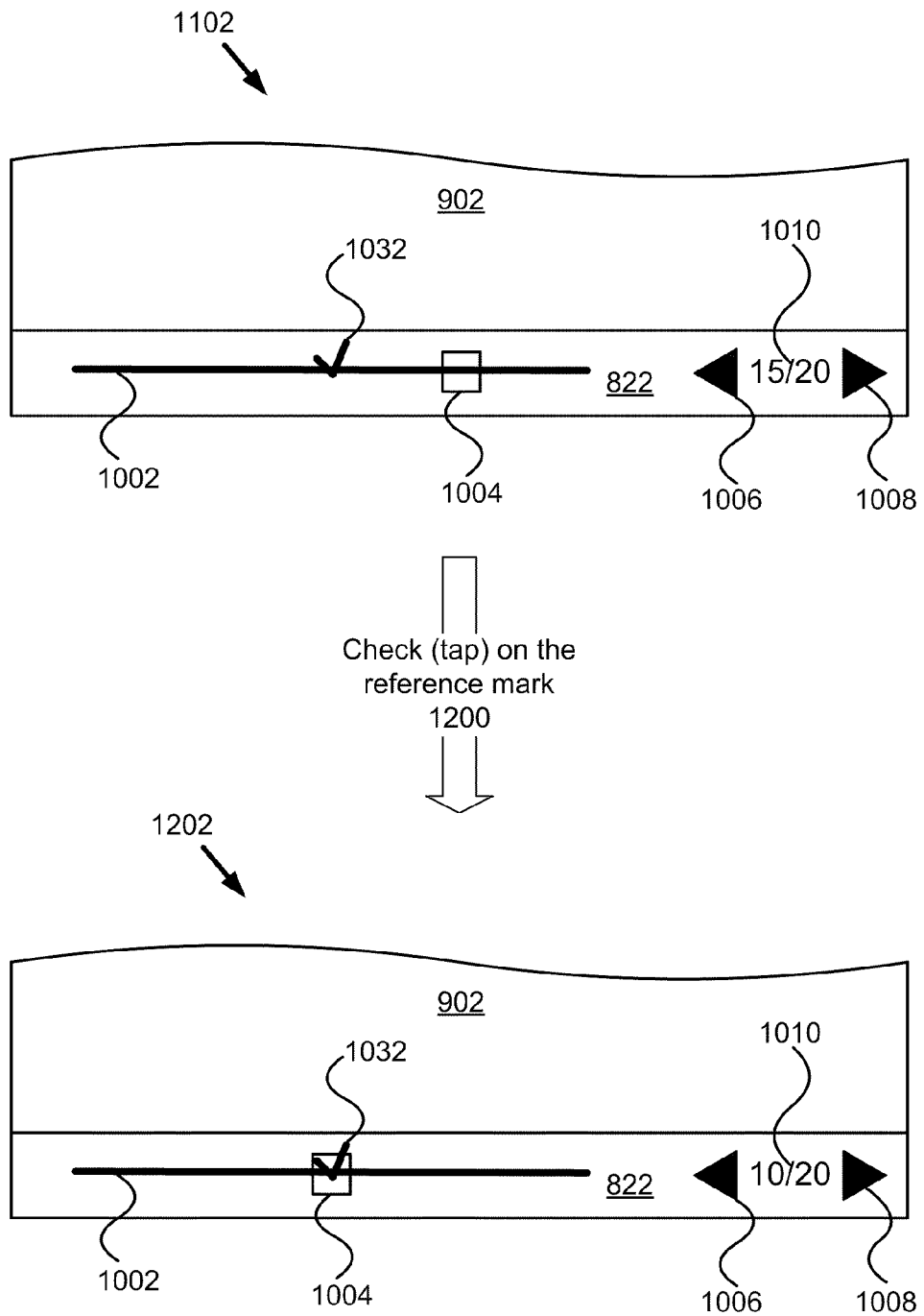
FIG. 12 is a graphic representation of a partial section of one embodiment of a user interface showing a navigation area before and after selection of a reference mark in accordance with the present embodiment of the invention.

Referring now to FIG. 12, the real advantage of setting the reference mark 1032 is shown. The top portion of FIG. 12 shows interface 1102 where the user has set the reference mark 1032 and then selected another page of the document to review, thus the page position indicator 1004 is moved to another location (e.g., not the same as reference mark 1032) indicating that another page (e.g., page 15) of the document is being displayed. This interface 1102 is identical to that shown at the bottom of FIG. 11. Now if the user wants to view a page that previously has been marked with a reference mark 1032, the user needs only tap 1200 on the reference mark 1032 and the computing pad 202 transitions from displaying interface 1102 to displaying interface 1202. The computing pad 202 also executes the method described above with reference to FIG. 7A and 7B. As can be seen in interface 1202, the page position indicator 1004 has moved from its location in interface 1102 to be at the same location on the position bar 1002 as the reference mark 1032 in interface 1202. Again although not shown, the display area 902 is updated to show page 10 of the 20 page document. Also, the page number indicator 1010 is updated to reflect that page 10 of 20 is being displayed.

Figure 13:
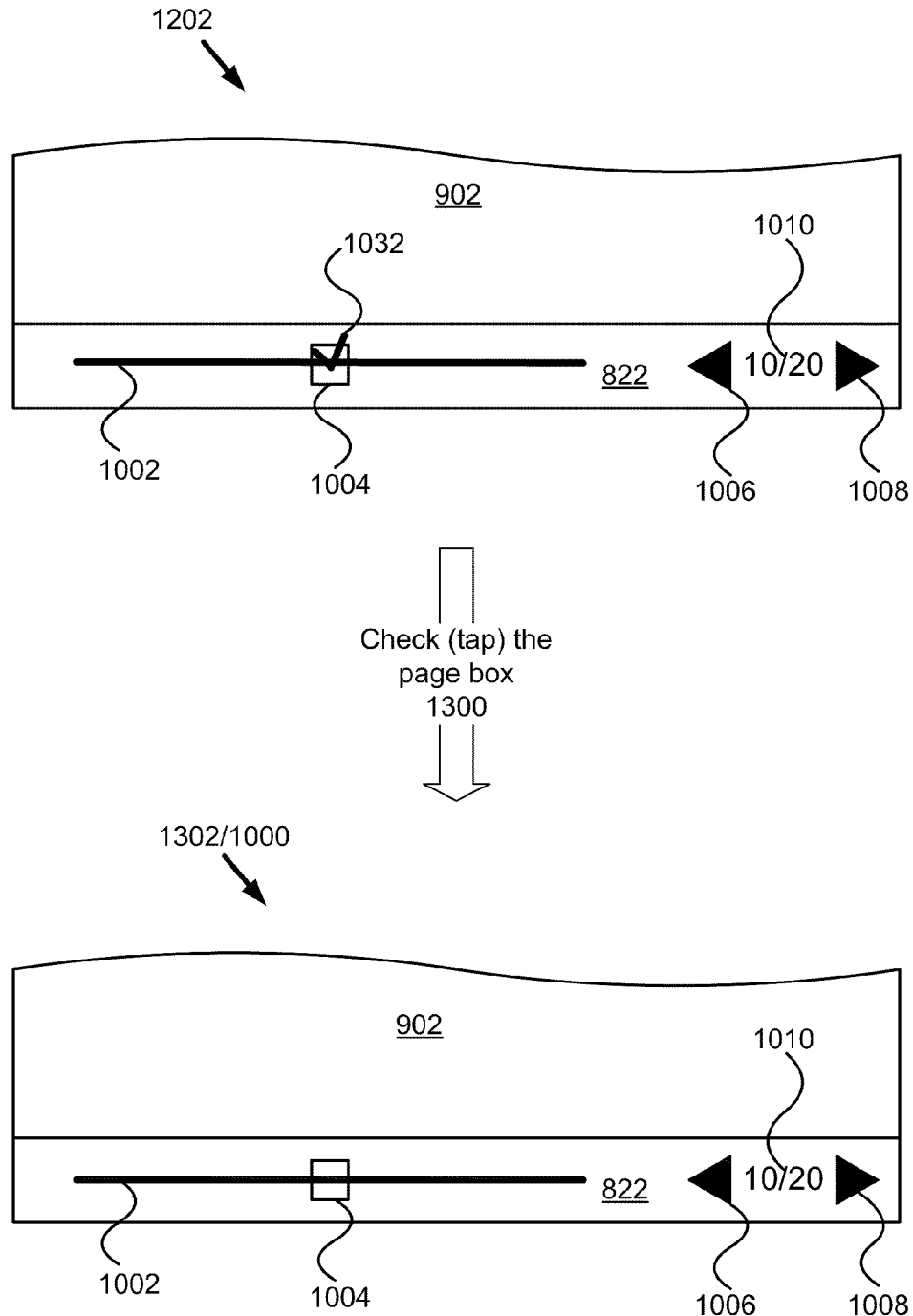
FIG. 13 is a graphic representation of a partial section of one embodiment of a user interface showing a navigation area before and after selection of the page position indicator in accordance with the present embodiment of the invention.

Referring now to FIG. 13, the change in interfaces 1202, 1302 associated with the removal of the reference mark 1032 are shown. The top interface 1202 shown in FIG. 13 is identical to the interface at the bottom of FIG. 12. This interface shows the page position indicator 1004 positioned at the same location on the position bar 1002 as the reference mark 1032. If the user wants to remove the reference mark 1032, the user needs only tap 1300 on the page position indicator 1004 in interface 1202. This causes the process described above with reference to FIG. 7A to be executed by the computing pad 202 with the end result being interface 1302. Interface 1302 is the same as interface 1000. As can be seen in FIG. 13 by comparing the two interfaces 1202, 1302, the reference mark 1032 has been removed from the position bar 100 in interface 1302.

Figure 15:
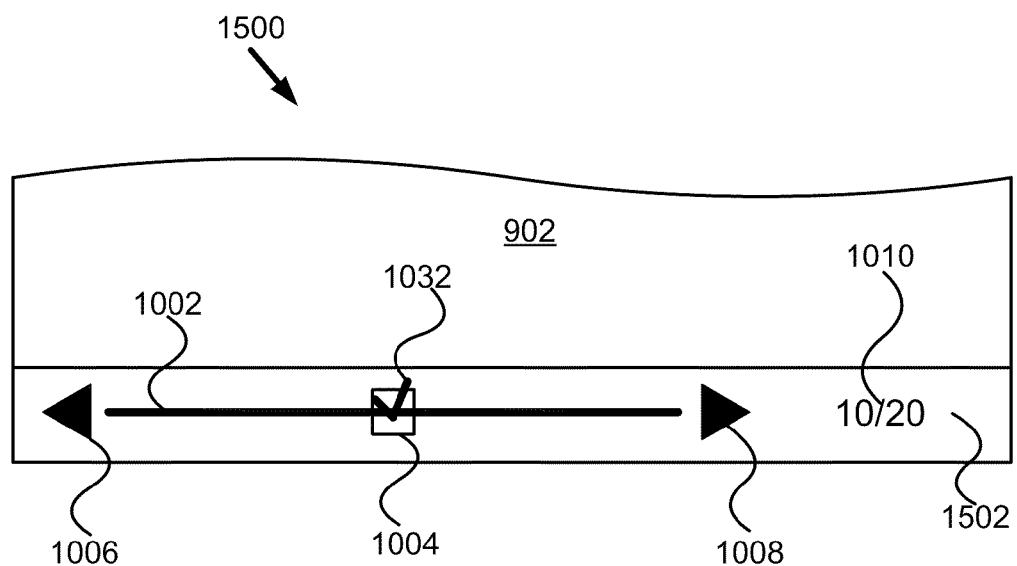
FIG. 15 is a graphic representation of a partial section of a second embodiment of a user interface showing a navigation area in accordance with the present embodiment of the invention.

Referring now to FIG. 15, a graphic representation of a partial section of a second embodiment of a user interface 1500 is shown. This alternate embodiment of the present invention places the previous page button 1006 and the next page button 1008 at opposite ends of the position bar 1002. Those skilled in the art will recognize that this is merely one embodiment for the elements of the navigation area 822 of the present embodiment of the invention. These elements may be configured in a variety of other organizational schemes while still providing the functionality of the present embodiment of the invention. Furthermore, while the present embodiment of the invention has been described above with the position bar 1002 being a linear representation of the pages of the document, those skilled in the art will recognize that other representations of the pages of the document are possible. For example, the position bar 1002 may be a hyperbolic representation (or any other monotonic function) of the pages of the document. In other words, movement of the page position indicator 1004 relative to its current location will have finer granularity for distances that are close to its current position and coarse granularity for distances that are far from its current position. Moreover, in yet another alternate embodiment, the position bar 1002 may associate the position of documents in the document with a fisheye graphical representation.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present embodiment of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of the invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for display and manipulation of document pages, the method comprising:
  displaying a document on a display device;
  displaying a navigation area having a position bar and a page position indicator, the position bar being a linear representation of pages of the document being displayed, the page position indicator placed on the position bar at a first location corresponding to a first page of the document being displayed;
  capturing a stroke input by sensing pressure that is applied to a stroke capture device;
  identifying a second location of the stroke input on the display device;
  determining whether the stroke input was within a threshold pixel distance of the page position indicator based on comparing the first location and the second location; and
  in response to the stroke input being within the threshold pixel distance of the page position indicator,
    if a first reference mark is displayed at the first location of the page position indicator, deleting the first reference mark and removing the display of the first reference mark;
    otherwise setting the first reference mark to the first page and displaying the first reference mark at the first location of the page position indicator.

2. The method of claim 1, wherein displaying the navigation area comprises:
  generating the position bar;
  determining a page order of the document being displayed; and
  generating and showing the page position indicator.

3. The method of claim 1, wherein the threshold pixel distance is based on a page count of documents viewed by a user.

4. The method of claim 1, wherein a size of the position bar is based on a page count of the document.

5. The method of claim 1, wherein:
  if the stroke input is near a plurality of reference marks placed along the position bar, determining a closest reference mark; and
  responsive to the stroke input being near the closest reference mark, determining a second page corresponding to a position of the closest reference mark,
    displaying the determined second page;
    moving the page position indicator on the position bar so that it is over the closest reference mark; and
    updating display of the navigation area.

6. The method of claim 1, wherein the page position indicator is at the first reference mark if the page position indicator and the first reference mark correspond to a same page of the document.

7. The method of claim 1, further comprising:
  determining whether the stroke input was near a second reference mark; and
  responsive to the stroke input being near the second reference mark,
    determining a second page corresponding to a position of the second reference mark;
    displaying the second page;
    moving the page position indicator on the position bar so that it is over the second reference mark; and
    updating display of the navigation area.

8. The method of claim 1, further comprising:
  determining whether the stroke input was near the position bar; and
  responsive to the stroke input being near the position bar,
    determining a stroke position on the position bar corresponding to the stroke input;
    determining a second page corresponding to the stroke position;
    displaying the second page;
    moving the page position indicator on the position bar to a second location corresponding to the second page; and
    updating display of the navigation area.

9. A computer program product comprising a non-transitory computer usable medium including a computer readable program, wherein the computer readable program when executed on a computer causes the computer to:
  display a document on a display device;
  display a navigation area having a position bar and a page position indicator, the position bar being a linear representation of pages of the document being displayed, the page position indicator placed on the position bar at a first location corresponding to a first page of the document being displayed;
  capture a stroke input by sensing pressure that is applied to a stroke capture device;
  identify a second location of the stroke input on the display device;
  determine whether the stroke input was within a threshold pixel distance of the page position indicator based on comparing the first location and the second location; and
  in response to the stroke input being within the threshold pixel distance of the page position indicator,
    if a first reference mark is displayed at the first location of the page position indicator, deleting the first reference mark and removing the display of the first reference mark;
    otherwise setting the first reference mark to the first page and displaying the first reference mark at the first location of the page position indicator.

10. The computer program product of claim 9, wherein the computer readable program when executed on the computer also causes the computer to:
  generate the position bar;
  determine a page order of the document being displayed; and
  generate and show the page position indicator.

11. The computer program product of claim 9, wherein the threshold pixel distance is based on a page count of documents viewed by a user.

12. The computer program product of claim 9, wherein a size of the position bar is based on a page count of the document.

13. The computer program product of claim 9, wherein:
  if the stroke input is near a plurality of reference marks placed along the position bar, determine a closest reference mark;
    determine a second page corresponding to a position of the closest reference mark;
    display the second page;
    move the page position indicator on the position bar so that it is over the closest reference mark; and
    update display of the navigation area.

14. The computer program product of claim 9, wherein the page position indicator is at the first reference mark if the page position indicator and the first reference mark correspond to a same page of the document.

15. The computer program product of claim 9, wherein the computer readable program when executed on the computer also causes the computer to:
  determine whether the stroke input was near a second reference mark; and
  responsive to the stroke input being near the second reference mark, determine a second page corresponding to a position of the second reference mark;
    display the second page;
    move the page position indicator on the position bar so that it is over the second reference mark; and
    update display of the navigation area.

16. The computer program product of claim 9, wherein the computer readable program when executed on the computer also causes the computer to:
  determine whether the stroke input was near the position bar; and
  responsive to the stroke input being near the position bar,
    determine a stroke position on the position bar corresponding to the stroke input;
    determine a second page corresponding to the stroke position;
    display the second page;
    move the page position indicator on the position bar to a second location corresponding to the second page; and
    update display of the navigation area.

17. An apparatus for display and manipulation of document pages, the apparatus comprising:
  a display device having an input, the display device displaying images;
  a stroke capture device having an input and an output, the stroke capture device capable of accepting strokes by sensing pressure that is applied to the stroke capture device and generating signals representing the strokes;
  a presentation module having an input and an output, the presentation module generating and presenting a user interface displaying a first page of a document and the presentation module adjusting the display of pages responsive to input from an input device or the stroke capture device;
  a position bar and bookmark module having an input and an output, the position bar and bookmark module navigating between pages of the document and generating and presenting a navigation area having a position bar and a page position indicator, the position bar being a linear representation of pages of the document being displayed, the page position indicator placed on the position bar at a first location corresponding to a page of the document being displayed on the display device, the position bar and bookmark module receiving a stroke input and a second location of the stroke input on the display device from the stroke capture device and determining whether the stroke input was within a threshold pixel distance of the page position indicator based on comparing the first location and the second location; and
  a processor coupled to the input of the display device to display an image of the page of the document, the processor coupled to the output of the stroke capture device to receive and store the strokes captured by the stroke capture device, the processor cooperating with the presentation module and the position bar and bookmark module to process the strokes to navigate between the pages of the document.

18. The apparatus of claim 17, wherein the position bar and bookmark module is responsive to pen inputs and adds, moves to, or deletes a reference mark.

19. The apparatus of claim 17, wherein the position bar and bookmark module determines a stroke position on the position bar corresponding to the stroke input, determines a second page corresponding to the stroke position and cooperates with the presentation module to display the second page.

20. The apparatus of claim 17, wherein the position bar and bookmark module determines whether the stroke input was near a reference mark, determines a second page corresponding to the reference mark and cooperates with the presentation module to display the second page.

* * * * *